US010121171B1

(12) United States Patent
Chang et al.

(10) Patent No.: US 10,121,171 B1
(45) Date of Patent: Nov. 6, 2018

(54) COMPONENT-LEVEL RATING SYSTEM AND METHOD

(71) Applicant: Amazon Technologies, Inc., Reno, NV (US)

(72) Inventors: Brian Chang, Seattle, WA (US); Min Chong, Kirkland, WA (US); Adam Brent Johnson, Seattle, WA (US); John Riley Lynch, Seattle, WA (US); Llewellyn James Mason, Seattle, WA (US); Francisco Jose Peredo Noguez, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 745 days.

(21) Appl. No.: 14/575,843

(22) Filed: Dec. 18, 2014

(51) Int. Cl.
| | | |
|---|---|---|
| *G06Q 30/06* | (2012.01) | |
| *G06Q 30/02* | (2012.01) | |
| *H04L 29/08* | (2006.01) | |
| *G06K 9/20* | (2006.01) | |
| *G06T 11/60* | (2006.01) | |

(52) U.S. Cl.
CPC ....... *G06Q 30/0282* (2013.01); *G06K 9/2081* (2013.01); *G06Q 30/0643* (2013.01); *G06T 11/60* (2013.01); *H04L 67/10* (2013.01); *G06T 2200/24* (2013.01)

(58) Field of Classification Search
CPC .......... G06Q 30/02; G06Q 30/0641–30/0643; G06Q 30/0282
See application file for complete search history.

(56) References Cited

U.S. PATENT DOCUMENTS

| | | |
|---|---|---|
| 8,504,486 B1 | 8/2013 | Pinto |
| 8,554,701 B1 | 10/2013 | Dillard et al. |
| 8,566,178 B1 | 10/2013 | Robinson et al. |
| 8,738,390 B1 | 5/2014 | Price |
| 2002/0010655 A1* | 1/2002 | Kjallstrom ............. G06Q 30/02 705/26.62 |
| 2011/0153463 A1* | 6/2011 | Lovelace ............... G06Q 10/10 705/27.1 |

* cited by examiner

*Primary Examiner* — Robert W Beausoliel, Jr.
*Assistant Examiner* — Nirav K Khakhar
(74) *Attorney, Agent, or Firm* — Knobbe, Martens, Olson & Bear, LLP

(57) ABSTRACT

Methods, devices and program products are provided which comprise the under control of one or more computer systems configured with specific executable instructions. The methods, devices and program products provide an image of an item for display, and the item is comprised of a plurality of components. The methods, devices and program products receive a selection of a component of interest from the plurality of components of the item, and obtain a component-level rating associated with the component of interest.

21 Claims, 14 Drawing Sheets

COMPONENT-LEVEL RATING SYSTEM AND METHOD

BACKGROUND

An online merchant may provide a number of items for sale to customers over the Internet. These items may include, but are not limited to, products, goods, services, digital media, downloadable music, streaming movies, and the like. Customers may access information regarding the available items through a website or other information service provided by the online merchant. The information regarding the items may include the information needed by the customer to identify and purchase a particular item, such as the name and description of the item, the price and availability of the item, and the like. In order to enhance the online shopping experience and allow the customer to fully research a particular item, the online merchant may provide additional item information along with the purchase information. The additional item information may include details or technical specifications for the item, a list of features, and customer reviews of the item.

The customer reviews may allow a potential purchaser to evaluate what other customers think about the item. The customer reviews may, for example, include a quantitative rating of the item as well as free-form comments provided by the customers regarding their impression of the item, their experience with the item, their overall satisfaction with the item, and the like.

However, there are many components of an item that separately contribute to a customer's overall impression or experience with the item. Heretofore, customers have not been afforded a manner to provide customer reviews in connection with individual components of an item purchased or of interest. Further, heretofore, potential purchasers have not been afforded content review related to individual components of an item.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical items.

FIG. 8 also illustrates portions of one example of an architecture for an item record.

DETAILED DESCRIPTION

Overview

Figure 1:
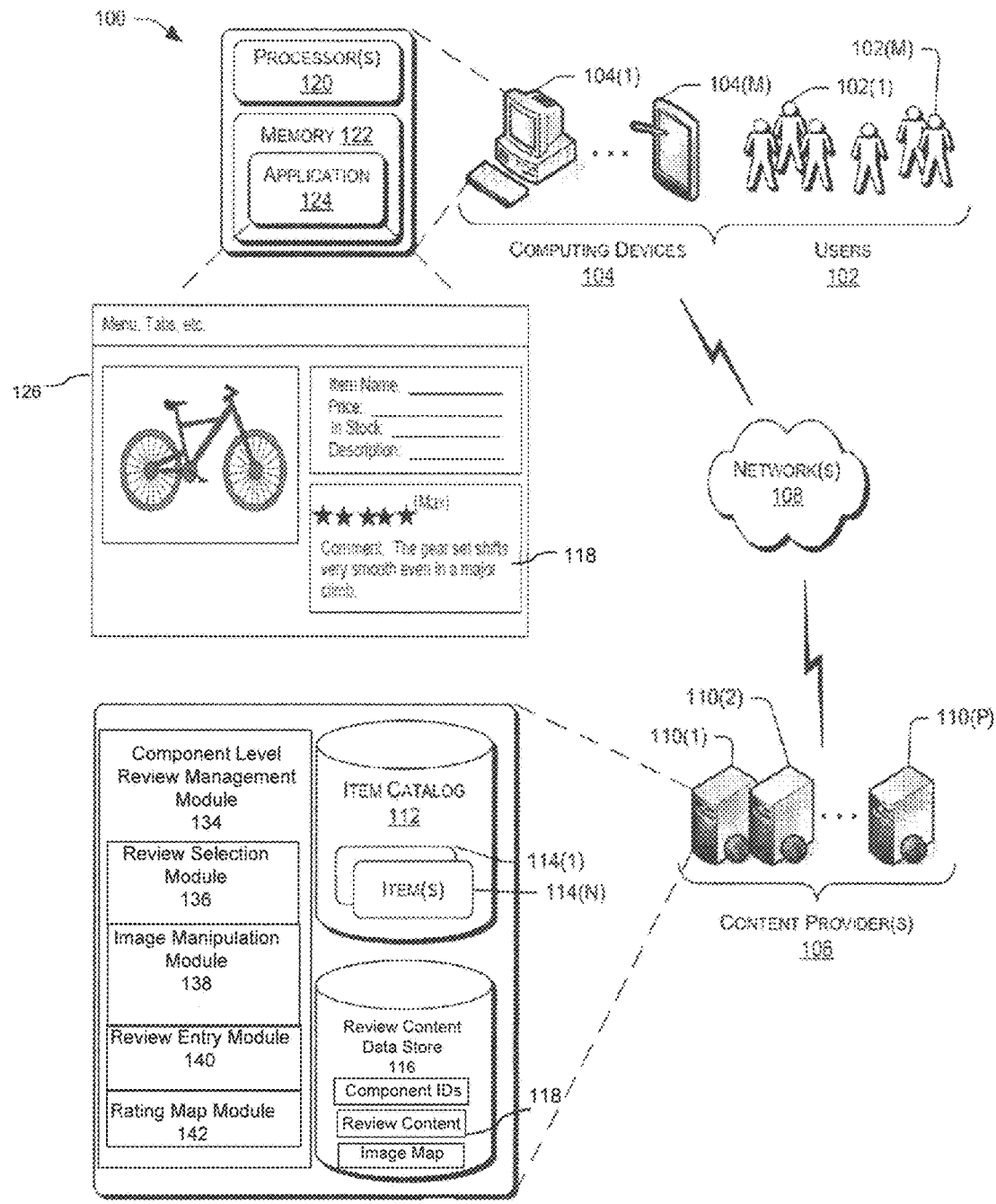
FIG. 1 is a schematic diagram of an example architecture for a system to enable users to provide and review ratings for individual discrete components of an item of interest in accordance with embodiments herein.

In accordance with embodiments herein, when a user purchases or otherwise acquires a product or service, an online service or system enables the customer to access an online service to enter a standardized rating, customer reviews and other review content in connection with the individual components of the product or service. For example, when a user buys a new laptop, the user may want to enter a customer review that separately rates the battery life, the display or other components. For example, the user may want to rate the battery highly (e.g. five stars), but give the board a poor rating (e.g. two stars). Further, the user may want to provide separate text, audio or video comments describing why the user did not like the keyboard (e.g., because the keys stick in the down position) or what was positive about the battery life (e.g. the battery last for several hours even in hot conditions). In accordance with embodiments herein, the user is no longer limited to entering a single standardized rating for the overall product.

The user no longer needs to average out (in their own mind) the positive and negative aspects of the product to derive an overall product level rating, and then in addition enter explanatory comments to step through the positive and negative aspects of the overall product. In accordance with embodiments herein, one or more service providers maintain item records associated with the various items offered in the service providers catalog or elsewhere. The item records include separate information related to the components of the item (e.g. the component of a laptop computer may include the keyboard, display, battery, wireless service, etc.: the component of a camera may include the lens, user display, battery, flash, tripod, etc.). Each item record maintains component level information in connection with each of the components in the item to enable customers to identify an individual component and enter a content review related thereto.

The systems, methods and computer readable medium herein also facilitate entry of the customer reviews for individual discrete components of interest comprised within an item for purchase or to be otherwise obtained. By facilitating entry and review of component level ratings, the methods and systems described herein allow users to provide more granular feedback as to the pieces of an item as compared to the traditional techniques that afford system level ratings of the overall item. Furthermore, by affording a standardized rating structure at the component level, the described techniques allow for better communication through customer reviews, and a better understanding by potential purchasers, regarding the individual parts, features and other content that collectively form the item. This level of granularity contrasts with traditional techniques that simply indicate approval or disapproval of an item in its entirety.

For example, the techniques described below may allow users to provide ratings and/or comments regarding individual components. A central service may aggregate each user rating/comment associated with each corresponding individual component and then provide aggregated ratings/comments in connection with each of the corresponding components when displaying the associated item to users that subsequently request the item.

In one example, a reviewer may purchase or otherwise become familiar with an item that comprises one or more components. The user may select individual components of the item (e.g., individual parts, features, content, etc.) and may express a rating or provide a comment for the selected individual component. The rating and/or comment may include numeric, graphic, text, audio and/or video content. For example, the user may select a thumbs up icon, a thumbs down icon, a "like" icon, a "dislike" icon, or may be able to rate an individual component at a finer level of granularity. For example, the standardized rating may be based on a scale of 1 to 10. Additionally or alternatively, the techniques described herein may allow the users to rate individual components from one star to five stars (where one star denotes strong disapproval and five stars denote strong approval) or by otherwise rating individual components on a scale of any other granularity. Regardless of how the users submit their rating/comment, the central service may store each rating/comment in association with the particular component that the user has rated.

In accordance with embodiments herein, the central service may present the ratings and comments in various manners, such as graphically, numerically, textually, audibly, tactilely, and the like. For instance, the service may provide an icon indicating the rating adjacent to the component, or the indication may be integral with the image of the component itself (e.g., a rating map). For instance, the component may be illustrated in various colors (e.g., red, yellow, blue, green), indicative of different rating levels or ranges. Additionally or alternatively, the component may be illustrated graphically to have an enlarged or reduced size that is different than a default size, to draw attention to the component (e.g. when one or more particularly good or bad ratings/reviews are associated therewith). Additionally or alternatively, text on or proximate to the component may be presented having a font type or style that is different than a default font type or style, or the like, to draw attention to the component. In accordance with embodiments, once a component of interest is identified, the component of interest may be presented in a highlighted manner, while a remainder of the item is dimmed or otherwise de-emphasized.

It will be readily understood that the components of the embodiments as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "some embodiments", "one embodiment" or "an embodiment" (or the like) means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, etc. In other instances, well-known structures, materials, or operations are not shown or described in detail to avoid obfuscation. The following description is intended only by way of example, and simply illustrates certain example embodiments.

For purposes of discussion, techniques for facilitating component level ratings/comments are described in connection with the example architecture. However, it should be appreciated that the described techniques may be implemented in multiple other architectures and environments.

FIG. 1 is a schematic diagram of an example architecture 100 for enabling users 102(1), . . . , 102(M) (collectively 102) operating respective computing devices 104(1), . . . , 104(M) (collectively 104) to view and provide review content for individual components of interest that collectively form an item that a user may wish to purchase or otherwise obtain. In this example, the users 102 are able to enter or view customer reviews, expressed as rating/comments, for individual components of items from an electronic catalog. As described above, however, these techniques apply to any sort of visual and/or audible content.

Within the architecture 100, the users 102 may operate the computing devices 104 to access one or more content providers 106 via a network 108. While illustrated as a personal computer and a personal digital assistant (PDA), the computing devices 104 may be implemented as any number of other types of computing devices. These devices may include, for instance, PCs, laptop computers, PDAs, mobile phones, set-top boxes, game consoles, electronic book readers, and so forth. The network 108, meanwhile, represents any one or combination of multiple different types of networks, such as cable networks, the Internet, private intranets, wireless networks, and the like. Again, while FIG. 1 illustrates the devices 104 communicating with the content providers 106 over the network 108, the techniques may apply in any other networked or non-networked architectures.

One or more servers 110(1), . . . , 110(P) (collectively 110), perhaps arranged in a cluster or as a server farm, may host the example content provider 106. Other server architectures may also be used to host the provider 106. In the illustrated implementation, the servers 110 are shown to include multiple modules and components, which may run as software on the web servers. The illustrated modules may be stored in memory (e.g., volatile and/or nonvolatile memory, removable and/or non-removable media, and the like), which may be implemented in any method or technology for storage of information, such as computer-readable instructions, data structures, program modules, or other data. The memory is also referred to as a data store and includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. While FIG. 1 illustrates the servers 110 as containing the illustrated modules, these modules and their corresponding functionality may be spread amongst multiple other computers, each of whom may or may not be related to the content provider 106.

In some instances, the content provider 106 comprises a site (e.g., a website) that is capable of handling requests from many users and serving, in response, various pages (e.g., web pages) that can be rendered at the computing devices 104. For instance, the site can be any type of site that supports user interaction, including online retailers, informational sites, social networking sites, blog sites, search engine sites, news and entertainment sites, and so forth. In another example, the content provider 106 provides an application 124 for the computing devices 104 to download, store, and run locally. The content provider 106 may additionally or alternatively interact with the devices 104 or provide content to the devices 104 in any other way.

In this example, the site of the content provider 106 represents a merchant website that hosts an item catalog 112 that stores one or more items 114(1), 114(2), . . . , 114(N) (collectively 114) and/or information regarding the items 114. An item includes anything that the merchant wishes to offer for purchase, rental, licensing, subscription, viewing, informative purposes, or some other form of consumption. In some embodiments, the item may be offered by the merchant for consumption. In some other embodiments, the merchant may host items that others are selling using the merchant's website. An item can represent a product, a service, a discussion forum, a digital download, a news clip, user-created content, information, or some other type of sellable or non-sellable unit.

While the item catalog 112 may store some items, the catalog 112 may additionally or alternatively store item records. The items records represent information regarding associated items being offered for sale or another form of consumption. The item record may contain a description of an item, two dimensional and/or three dimensional images of the item, a 3D model of the item, manufacturer/author/artist names, manufacture/publication data, pricing, shipping information, and so forth. For other types of items, the item record may contain additional and/or different information appropriate for those items. The item records may be arranged in various formats and are not limited to any particular file structure. The term record is used broadly herein to refer to any type of logical connection or link between various data or information.

An item comprises one or more components that collectively interconnect, interact or otherwise cooperate to provide the full functionality of the item. As used herein, the term "component" includes, but is not limited to, tangible components such as parts and pieces that are hardware, software, mechanical, structural, material based or any other tangible or intangible unit that a user may desire to provide or read a separate customer review in connection there with. Non-limiting examples of tangible components are electrical devices, electrical circuits, software, hardware, mechanical devices, mechanical subsystem, housing assemblies, materials, accessories and any other single or collection of physical pieces or part combined to form an item. Non-limiting examples of intangible components refer to and include appearance, functions and features offered by an item, such as the appearance, functions and features of a digital product, a user interface, a game, a software application, and the like. The term component also refers to and includes characteristic components that may describe a result achieved by an item, such as a quality of photographs, video recording and/or audio recordings. The characteristic components also include ornamental and aesthetic aspects of an item, such as the look, touch and feel of the item. The term component also refers to and includes consumable components such as substances (e.g. liquids, solids, powders, gases, etc.) that may be held within, dispensed from or otherwise used with an item. The foregoing is not to be viewed as an exhaustive list of components.

A component level review includes ratings and/or comments associated with a specific select component and may be dis-associated or unrelated to other components. Particular non-limiting examples of components and reviews include, but are not limited to, when a user seeks to buy a new laptop, individual components may represent the screen, keyboard, battery life, audio system and the like. Examples of separate reviews may be that the review for the screen as a component indicates: "The screen quality is very good", whereas the review for the keyboard as a component indicates: "The power button sticks and needs to be wiggled before it will pop up". In accordance with embodiments herein, by affording component level reviews and ratings, the user is permitted to search for items, for which certain components are highly rated. For example, when the user is searching for a new laptop, the user may want to only review laptops having batteries with a five-star rating, or laptops for which no component has less than four stars.

When a user requests an item (or information about an item) from the content provider 106, the servers 110 retrieve the item information from the item catalog 112 and serve the information (e.g., via a web page) to the computing device 104 of the requesting user. The item catalog 112 may contain static pages that are pre-generated and stored prior to such requests, and/or may store data that is used to populate dynamic pages that are generated in response to such requests. For example, the stored data may be used to generate tables, window content, two-dimensional or three-dimensional images, as well as 3D models that may be rotated and otherwise manipulated by the user to view the item from various directions and angles and/or to view various components of interest comprised within the item.

The servers 110 may further store, or have access to, a content data store 116 that includes one or more discrete pieces of review content 118. The review content 118 may comprise any sort of content, such as review content provided in whole or in part by the users 102. For instance, the review content 118 may include ratings and/or comments reviewing an item within the item catalog 112, as well as ratings and/or comments reviewing the individual components or parts comprised within the item. FIG. 1 illustrates, for example, an example of a customer review for components of a bicycle stored in the item catalog 112. For example, one or more customer reviews may be stored for each of the brake components, the gear system, the tires, the seat, the handlebars, the colors, the comfort and the like. The components available to be reviewed in connection with an item may be determined in various manners. For example, existing product level (and component level) reviews may be analyzed (e.g. manually or through automatic text analysis) to identify comments associated with particular components in the product/item. When a sufficient number of comments are identified as discussing a particular component, the corresponding component may be designated to be made available for separate component level reviews as explained herein. Additionally or alternatively, automated processes may perform text analysis of various product related documents to identify components to be made available for separate component level reviews. Additionally or alternatively, item manufacturers and/or distributors may provide a list of components for which separate component level reviews are believed of interest to customers.

In the illustrated example, the computing device comprises one or more processors 120 and memory 122, which stores an application 124 (e.g., a browser, etc.) that communicates with the content provider 106 over the network 108. Here, the user 102(1) requests, and the content provider 106 serves, a user interface (UI) 126 that includes the customer reviews 118 of the select bicycle component that is selected by the user 102(1). For instance, the user 102(1) may select a particular component of interest to view prior reviews.

The customer review 118 within the UI 126 may indicate where one or more other users have expressed a prior rating/comment for individual components of the item. In the illustrated example, for instance, the UI 126 illustrates (via bold, italicized, color-coding, hashed overlay, oversized lettering, highlighting) that the gear component has received a 5 star approval from one or more users. Additionally or alternatively, the user may enter additional rating information associated with the component, such as text, audio, video, a rating along a standardized scale (e.g., 3 stars, 5 stars, etc.) and the like.

To perform the functionality described immediately above, the content provider 106 stores or otherwise has access to a component level review management (CLRM) module 134. While FIG. 1 illustrates various modules within module 134 being stored on or accessible by the provider 106, in some instances some or all of the modules may reside in memory on one or more other entities. For instance, some or all of the modules may reside on the computing devices 104 in some instances. Furthermore, in some instances, the modules shown in the content provider 106 may provide code to the respective computing devices 104 to perform the respective functionality of the modules.

The CLRM module 134 performs the various operations described herein and illustrated in the figures. The CLRM module 134 includes various modules such as a review selection module 136, an image manipulation module 138, a review entry module 140 and a rating map module 142. The modules 134-142 are stored in memory on one or more servers, on one or more computing devices and elsewhere. In some embodiments, processors of the servers and/or computing devices implement the modules 134-142 through software, firmware and the like. The modules 134-142 may comprise code executable on the computing device 104(1) and/or the content provider 106.

The review selection module 136 implements the operations described herein in connection with receiving user input associated with selecting a component of interest. The review selection module 136 also accesses item records and review content in the image catalog 112 and in the review content data store 116 associated with the component of interest selected by the user. The image manipulation module 138 manages presentation of images and other windows on item pages related to one or more select items on displays of the computing devices and elsewhere. The image manipulation module 138 also receives user inputs in connection with changing the images to be displayed. The image manipulation module 138 also receives user inputs and in response thereto manages rotation, translation and other manipulation of the images, such as in connection with selecting components of interest.

The review entry module 140 implements operations described herein in connection with receiving new review content from a user and adding such review content to the review content collection associated with a component. The rating map module 142 implements operations described herein in connection with overlaying graphical indicia on one or more images of an item where the graphical indicia indicate ratings assigned to the various components within the item. As one example, the rating map module 142 may superimpose a heat map on an image of an item where regions of the item are color-coded in connection with ratings assigned to the respective components.

In some instances, one or more of the modules 136-142 reside on the computing device 104(1) for execution by the application 124 (e.g., as a plug-in to the application 124, which may comprise a browser). In this and other instances, these components may comprise scripts, Adobe Flash® multimedia software, or any other type of code that may be executed in real time on the client side. For instance, this code may be implemented in script that detects when the user 102(1) highlights, clicks on or draws a box around a select region on the image, and in response displays ratings, comments or opens a rating entry window. While this example describes the rating/comment as being displayed in response to a user selection, in other instances, the rating/comment may be output prior to the selection. Furthermore, while this code may execute on the computing device 104(1), in other instances the computing device may make calls to the content provider 106. For instance, the techniques may be implemented via Asynchronous JavaScript and XML (AJAX) or via any other client/server protocols.

After the user 102(1) provides a rating to a particular component, the content provider 106 aggregates this received rating/comment with other previously-received ratings/comments associated with this component (e.g., word, sentence, etc.).

Figure 2:
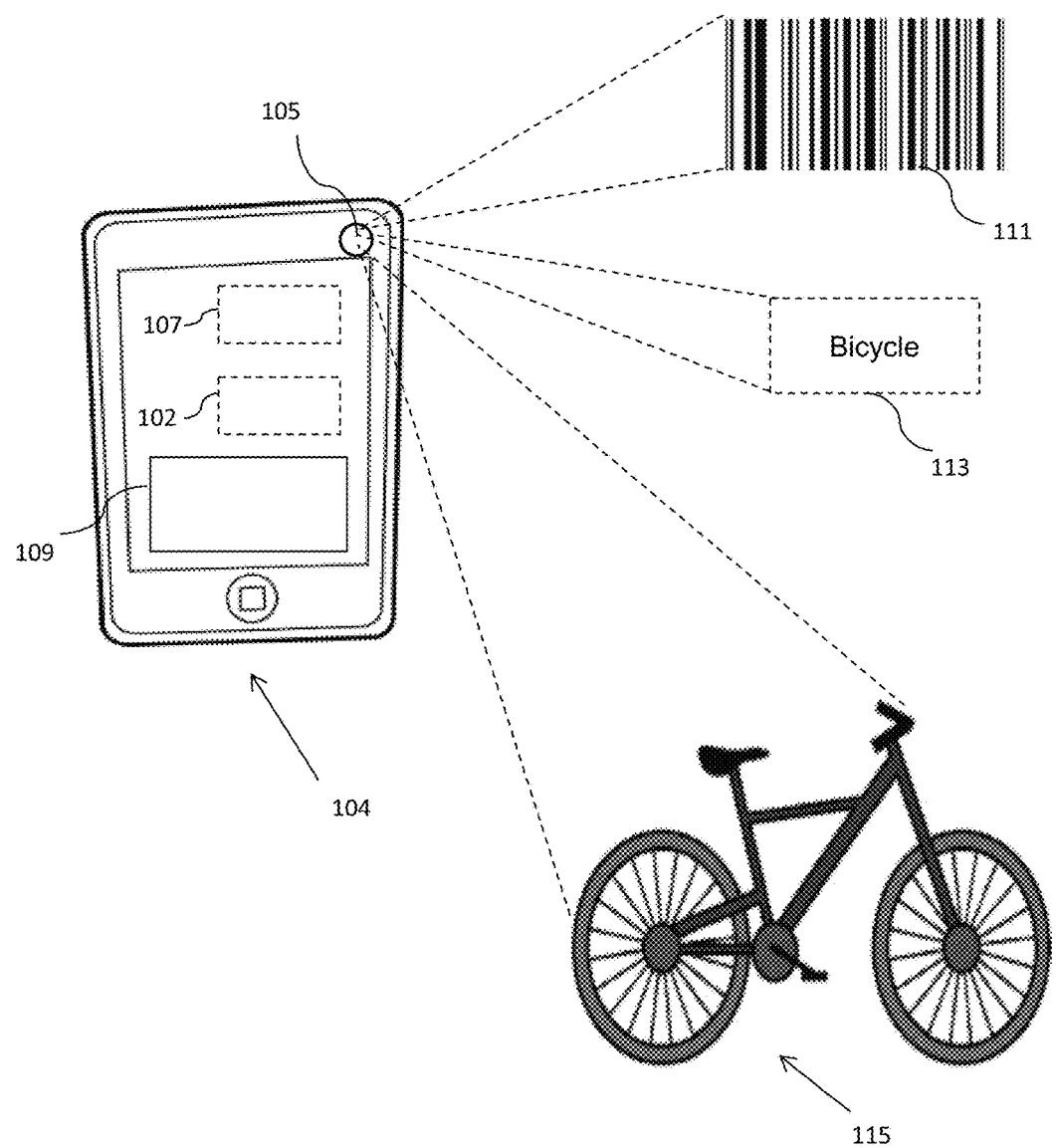
FIG. 2 illustrates a computing device configured to capture information to identify an item or component of interest in accordance with embodiments herein.

FIG. 2 illustrates a computing device 104 that may be utilized to identify an item or component of interest in accordance with embodiments herein. The computing device 104 includes a lens 105 that is coupled to a camera unit 107 within the computing device 104. The camera unit 107 may represent an imager and include a solid state device such as a charge coupled device (CCD), a complementary metal-oxide semiconductor (CMOS) detector and the like. The camera unit 107 captures photographs or video of items or components of interest that are visible within the field of view of the lens 105 under the control of a user interface 109 of the computing device 104. In the example of FIG. 2, the computing device 104 may be used to scan barcodes 111. The computing device 104 may also take pictures of text 113 naming an item or component of interest. The computing device 104 may also take pictures or video of photographs or physical embodiments of an item 115. The camera unit 107 provides the photos or video to the processor 102 which analyzes the content of the barcode, photos or video to identify the item or component of interest. The computing device 104 passes an identification of the item or component of interest to the content providers 106 for further processing in accordance with embodiments herein. For example, when the computing device 104 passes an identification of an item or component to the content providers 106, the content providers 106 may return one or more item pages as discussed herein (e.g. as illustrated in FIGS. 3A-3E).

Figure 10:
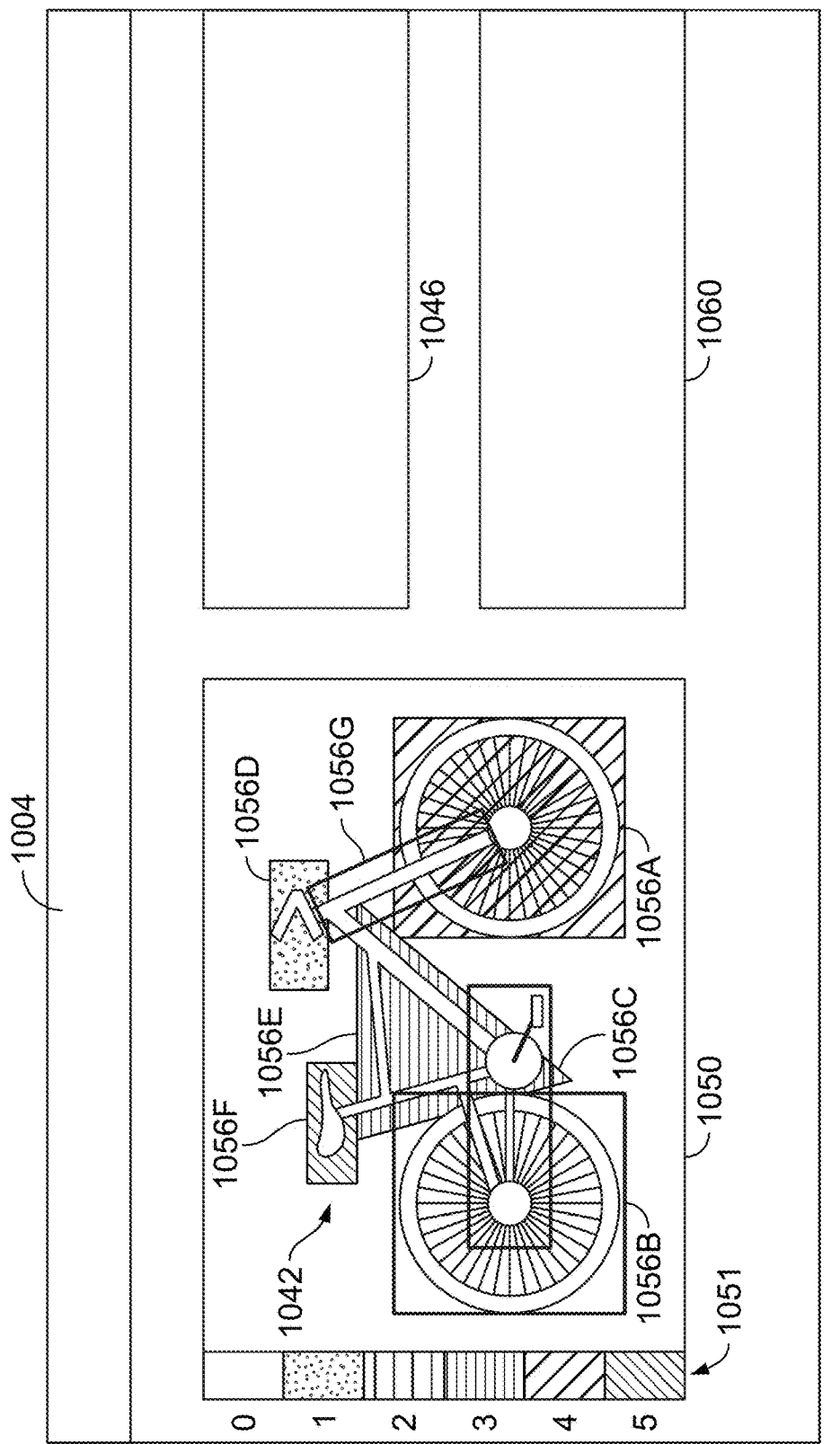
FIG. 10 illustrates an image page with a rating map that may be presented in accordance with various embodiments.

Optionally, the computing device 104 may be utilized to both identify an item (e.g., a bicycle 115), as well as display component level ratings in connection there with. For example, the user may point a lens 105 of a computing device 104 (e.g. a cell phone, tablet, etc.) at an item. Optionally, the computing device 104 may internally processes the image to identify the item. The computing device 104 may convey the image of the item and/or an identification of the item to a server 110. The computing device 104 may present an image of the item on the user interface of the computing device 104 and permit the user to select a component of interest, such as by touching a touch sensitive user interface in an area associated with a component of interest. The server 110 may return component level ratings associated with the identified component, and/or component level ratings associated with each component within the item. The user may enter and/or review component level ratings on the user interface of the computing device 104 as explained herein. As one example, the display of the computing device 104 may present an image of the item, as well as a standardized rating (e.g. 1 to 5 stars) next to each component of the item (such as illustrated in FIG. 3C). As another option, a rating map may be overlaid upon the image of the item on the user interface of the computing device 104 (such as illustrated in FIG. 10).

FIGS. 3A-3E graphically illustrate examples of user interfaces that may be presented by an online merchant's website for display at computing devices 104 that may include or leverage the component level content reviews generated as described herein to assist customers in making decisions when considering products or items for purchase or to otherwise obtain. Note that the user interfaces in FIGS. 3A-3E are given by way of example, and are not intended to be limiting. The component rating and other information generated as described herein may be used or displayed in other ways and in other user interface contexts than those shown.

Figure 3A:
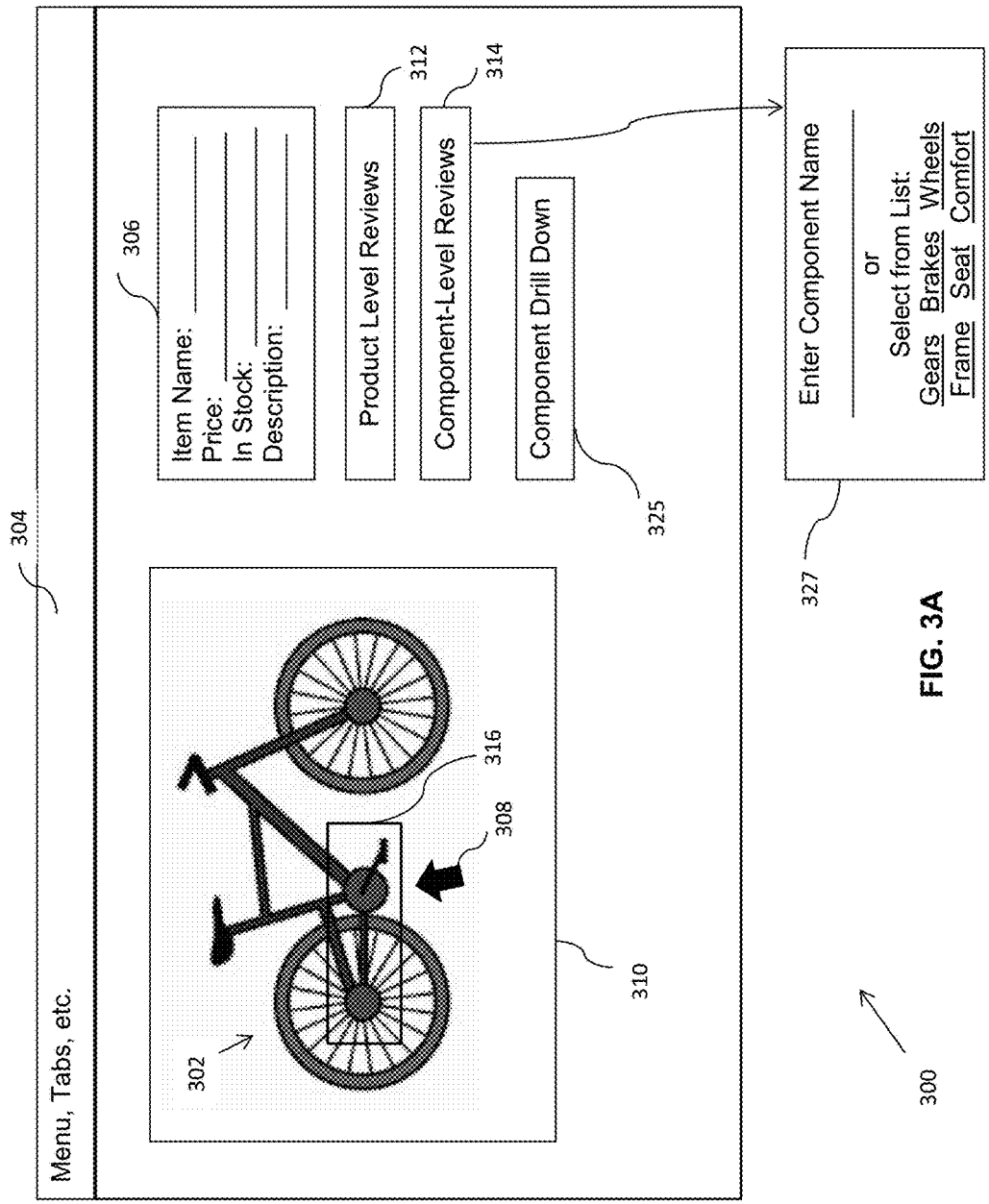
FIG. 3A illustrates an example item page that displays one or more images of an item in an image window, according to at least some embodiments.

FIG. 3A illustrates an example item page 300 that displays one or more images 302 of an item in an image window 310, according to at least some embodiments. When a customer navigates to an item page 300 on an online merchant's website, product/item information 306 may be displayed, for example vendor- or manufacturer-supplied descriptions, images, pricing information, availability information, product numbers, ordering information, and so on. In the example of FIG. 3A, the item 302 represents a bicycle displayed in an image window 310. The item page 300 may also include various user interface elements 304 such as menus, buttons, tabs, scroll bars, hot links, and so on, that may be used for navigation (e.g., go to another page), page control (e.g., scroll down), or various other purposes. The customer may interact with the user interface elements 304 of the item page 300, for example using a cursor control device such as a mouse and a keyboard or, on a touch-enabled device, touch gestures input to a touch screen.

The image window 310 may present one or more images 302 (serially or concurrently displayed) related to the item of interest. The image window 310 may present the images 302 as two dimensional images, three dimensional images, and/or a 3D model of the item. The images 302 may be manipulated by the user through elements of the user interface (e.g., keyboard, mouse, touchpad, touchscreen, audio commands, etc.) of the computing device. For example, the user may hold a cursor 308 on the image 302 and perform a "click and drag" operation on a mouse to rotate, translate or otherwise manipulate the view of the item. For example, when the user desires to view a back side of the item, the user may click and drag the cursor 308 to cause a 3D model of the item to rotate 180° until the backside is displayed. Similarly, elements on the user interface of the computing device 104 may be used to view the bottom, top, ends and other portions of an item of interest. Elements on the user interface may be used to enlarge or shrink portions of the image 302.

In some embodiments, the item page 300 may include one or more system/product level customer reviews (not shown) that provide customer ratings and customer comments related to the overall item displayed in the image 302. Additionally or alternatively, the item page 300 may include an overall product level review tab or icon 312 and/or a component level review tab or icon 314. To view customer reviews of the overall product, 312 is selected. To view customer reviews related to individual components within the product, tab 314 is selected. Additionally or alternatively, when the user selects the component level review tab 314, a component selection window 327 may be presented to afford the user the option to enter the name of the component of interest or to select from a list of available components of interest. Optionally, the tabs 312 and 314 may be omitted entirely.

In some embodiments, the image window 310 supports selection through the user interface elements 304 of one or more components of interest in the item. Using the bicycle example of FIG. 3A, examples of separate, individual components of interest include the gears, brakes, wheels, suspension system, frame, seat, handlebars and the like. When a component level review is desired for one or more of the components, as one example a region on the item may be designated through the user interface of the computing device 104. As one example, a cursor 308 may be positioned on a select region of the image 302 where the component of interest is illustrated or otherwise associated. The cursor 308 may be held to "hover" over the select region for a predetermined period of time. When the cursor 308 is positioned on a select region for the predetermined period of time, one or more region designator 316 may pop up in the image window 310 indicative of the component or components of interest associated with the region designated. The region designator 316 may be presented in various manners, such as but not limited to a box overlaying a component of interest, a free-form closed boundary surrounding a component of interest, a highlighted region, a change in the size (e.g. enlarged or shrunken) of the component of interest and the like. The box or closed boundary may have a transparent core so that the component of interest is fully visible within the box or closed boundary.

Optionally, the box or closed boundary may include shading, hash marks, or another partially transparent graphic indicia superimposed over the component of interest. Alternatively, the region designator 316 may be presented as soon as the cursor 308 is located on, or proximate to, a component of the item (e.g. without waiting a predetermined period of time). Additionally or alternatively, the user may enter an additional command through the user interface (e.g. a right or left mouse click, a keyboard entry, an audible instruction, a touch command to a touch sensitive screen) to request/direct display of the region designator 316.

In some embodiments, a component drill down feature 325 may be provided to the user. When a user is interested in viewing more information about a rated component, the user will be able to click on the component drill down feature 325, in response to which additional detailed information regarding the component is displayed. Non-limiting examples of the detailed information include a number of users who contributed to the rating, the components that users have rated, and/or any additional text the user wrote to support the rating.

Figure 3B:
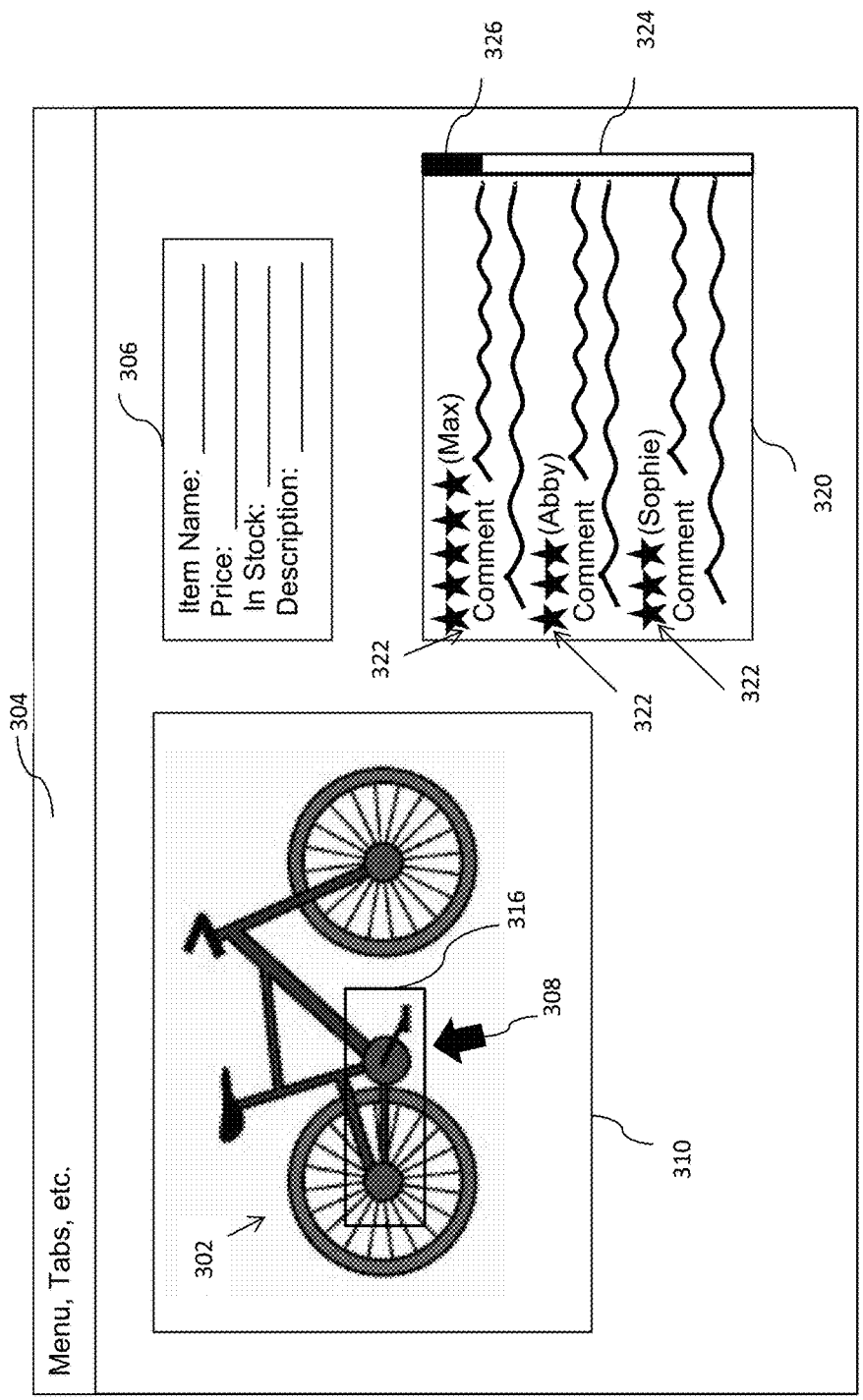
FIG. 3B illustrates an item page presenting a component level rating window that includes one or more component level ratings associated with the component or components within the region denoted by the region designator in accordance with embodiments herein.
Figure 3C:
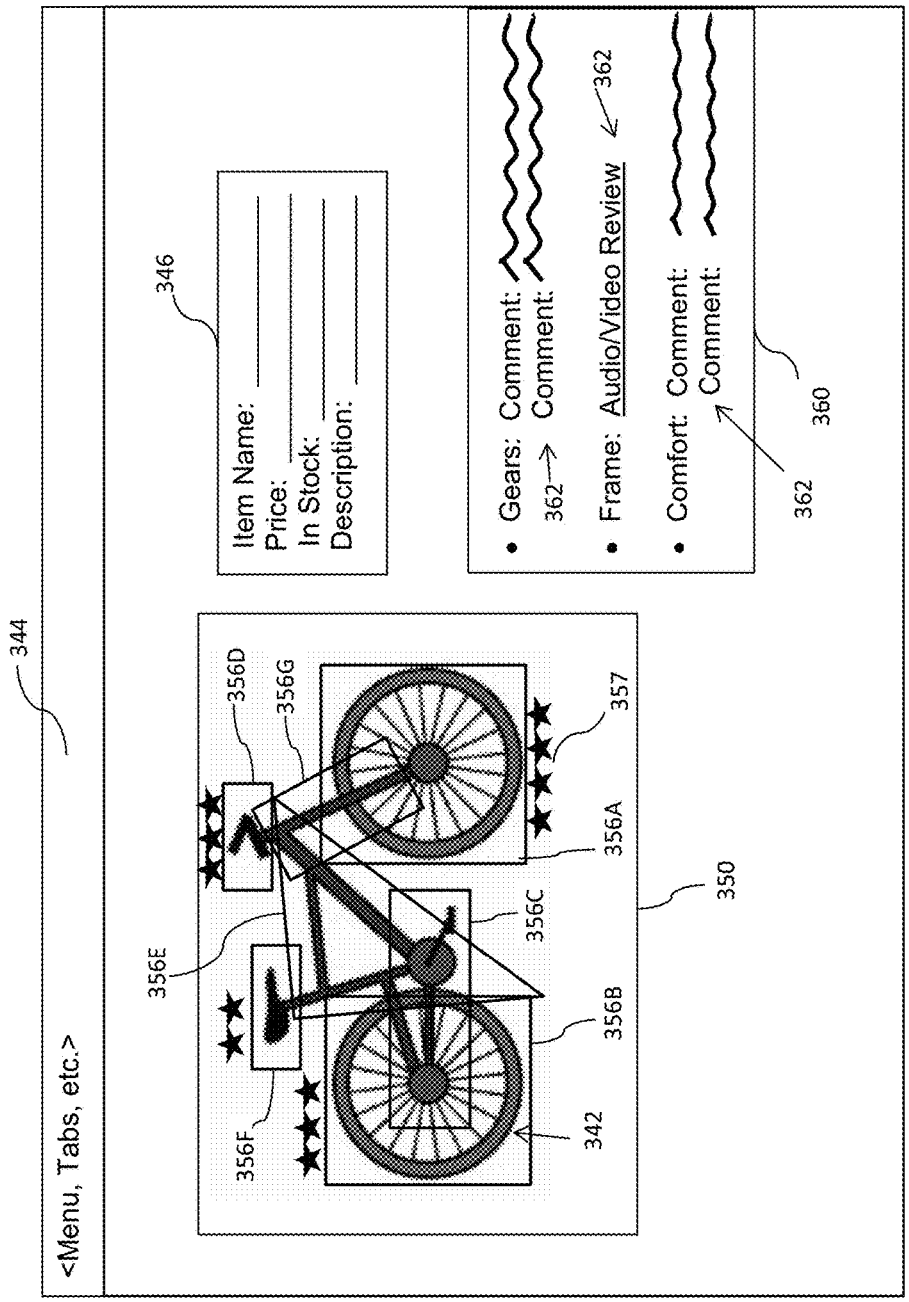
FIG. 3C illustrates an image page that may be presented in accordance with various embodiments.

FIG. 3B illustrates the item page of FIG. 3A once a component of interest is selected. The item page 300 presents a component level rating window 320 that includes one or more component level ratings 322 associated with the component or components within the region denoted by the region designator 316. In the example of FIG. 3B, three component level ratings 322 are illustrated, each of which includes a customer identifier (e.g. a name), a number of stars indicative of a rating assigned by the customer, and text comments provided by the customer. It is recognized that only a portion of the rating information may be displayed (e.g. limited simply to a star rating or other scaled rating indicator). Optionally, different or additional rating information may be provided in connection with the selected component. When more than one component is selected within the region denoted by the region designator 316, the user may be afforded the opportunity to pick one of the components, for which reviews may be presented. Optionally, reviews for each of the components within the region denoted by the region designator 316 may be presented (e.g., reviews for the brakes, gears and pedals may all be co-displayed and organized in various manners).

Optionally, additional ratings may exist that cannot be co-displayed in a single rating window 320. The user may scroll through these additional ratings 322 in various manners. As one example, a slide bar 324 may be presented and the user permitted to drag a marker 326 along the bar 324 to scroll through the ratings 322.

In some instances, the user may desire to update their review as the user learns more about an item or component. For example, a user may indicate that assembly was difficult, however thereafter the item operated very well. Embodiments herein permit the user to update reviews. As one example, sections of a review may be marked with a time stamp to identify particular points in time. The point in time associated with each section of a review is maintained and stored in the item record, such as part of the content review.

The component level ratings 322 may be organized in different manners. For example, the ratings 322 may be presented with the most recent review/rating first and the oldest review/rating last. The ratings 322 may be presented with the best rating first followed in decreasing order. An individual component level rating 322 may be aggregated for various customer reviews associated with the corresponding component. For example, an overall average customer rating may be provided in connection with each associated component (e.g., based on a number of "stars" or other metric with which customers may rate). Customer ratings and information may include reasons to buy an item. In some embodiments, a <count> may be displayed to indicate how many reviews the corresponding component received. In some embodiments, when multiple components are within the region designator 316 a count of the number of component level ratings may be used as an indicator of relevance of the rating/comment in regard to this component. For example, a first component (e.g. gears) with more hits (a higher count) may be considered more relevant than a second component (e.g. pedals) with fewer hits. In some embodiments, the ratings/comments may be sorted, for example according to <count>. In some embodiments, a customer name or identifier may be provided with each rating/comment.

In some embodiments, the ratings and/or comments that are displayed in the rating window 320 may be filtered and personalized according to customer information and/or preferences (e.g. based on prior searches by a present user, based on user profile information stored in an account for the present user and the like). Additionally or alternatively, the item page 300 may display summary statistics for the component. Summary statistics may include one or more metrics or statistics determined from analysis of customer reviews as expressed in the comments (e.g., a ratio of positive to negative sentiment for the corresponding component, or other statistics based on sentiment scoring). Summary statistics may be displayed graphically and/or textually. For example, summary statistics may be displayed as charts or graphs of various types.

It should be noted that the various windows presented on the item page 300 may be formatted to be more compact than as illustrated in FIGS. 3A-3E. As such, the more compact display of information for an item may be useful for interfaces on consumer devices with small screens such as cellphones, smartphones, and small tablet or pad devices.

Various items of interest are symmetrical in certain manners, such that a common component may exist at different physical locations upon the item. Accordingly, the common components may not be collectively selected through a simple user entry. For example, it may not be desirable to separately provide reviews for each bicycle wheel, each roller on a chair, each speaker on a stereo and the like. Yet, the common components fall within a single logical group. Accordingly, when an item includes multiple common components, the common components may be logically grouped within an item record, such that when review content is provided with respect to one of the common components, the same review content is combined with review content for any one or more of the common elements. The common elements may be designated to fall within a single logical group by vendors, programmable through machine analysis and/or by customers. To illustrate the logical group to the user, when a user selects one component, all components in the logical group may be shown in region designations 316. The user may then "deselect" one or more components from the group, such as by "clicking" on the deselected component with the cursor. Alternatively, the common elements are associated with one another, users may not be afforded the opportunity to rate one component from a logical group. While it may be desirable to rate a single arm rest of a chair (e.g. due to a manufacturing defect), the review content can capture issues pertaining to a single component within a logical group with minimal loss of information at the group level.

FIG. 3C illustrates an item page 340 that may be presented in accordance with various embodiments. The item page 340 includes user interface elements 344, an image window 350 (that illustrates one or more images 342), item information 346 and a rating window 360. In the example of FIG. 3C, the image window 350 concurrently presents and superimposes the image 342 and region designators 356A-G indicating associated components that collectively define the item. All or a subset of the region designators 356A-G may be co-displayed and overlaid upon one another to present all or a subset of the user's potential choices in a single window. For example, region designators 356 A, B designate and correspond to the wheels, while region designator 356C designates and corresponds to the gears, chain and pedals.

Region designators 356D, E, F and G designate and correspond to the handlebars, frame, seat and the front suspension system, respectively. It is understood that the region designators 356 A-G are by example only and that alternative and/or additional region designators associated with other components may be utilized.

The image window 350 also includes rating indicators 357 positioned proximate to one or more of the region designators 356A-G. The rating indicators 357 may be overlaid upon the corresponding component, may be located within or adjacent to the corresponding region designator 365A-G, or may be located elsewhere. The rating indicators 357 include rating denoting indicia such as a number of stars to indicate a component level rating attributed to the corresponding component from one or more customer reviews. For example, the rating indicator 357 may be presented as a graphical indicator, a numeric number, a color coding (e.g. a rating map, as discussed below in more detail) and/or another format to graphically or otherwise visually and/or audibly indicate a rating.

Alternatively or additionally, a rating window 360 may be included within the item page 340 to present one or more component level ratings 362 associated with the components within the region designators 356A-F. The rating window 360 includes component level ratings 362 in connection with the various components that form the item. As illustrated in the example of FIG. 3C, component level ratings 362 are provided for the gears, frame and comfort of the bicycle. The component level ratings 362 may include various types of rating information including, but not limited to, text comments, audio and/or video review clips and the like. Optionally, the rating scores denoted by the rating indicators 357 may also be moved to, or repeated in, the rating window 360. The rating information presented in the rating window 360 may represent component-level aggregate ratings that combine multiple individual customer reviews in connection with the corresponding component. Additionally or alternatively, non-aggregated individual customer reviews may be presented in the rating window 360. The individual customer reviews may be ordered or grouped by component, date, level of the rating, an amount of detail in the rating, or otherwise. The rating window 360 may toggle or switch between aggregated and non-aggregated customer reviews in response to a user input at elements 344. Optionally, the rating window 360 may present item level rating information in connection with other items that include the same or similar components. For example, the item level rating information may list various items include the component of interest, along with average ratings assigned to each such item. For example, when the user views component level ratings for a particular make/model of a gear set on a particular make/model bicycle, the rating window 360 may list other make/model bicycles that use the same make/model gear set, as well as average ratings assigned to the other make/model bicycles. The rating window 360 may also present average ratings assigned to the same gear set when implemented on the make/model bicycles, such as in order to inform the user as to whether a particular gear set has received low or high ratings regardless of the bicycle used, or whether the gear set rating varies depending upon the make/model of bicycle.

Optionally, an additional window may be presented (not shown) or the rating window 360 may be expanded to present, components on other items that may be interchangeable with the component presently being reviewed. For example, when the user views component level ratings associated with a gear set, the rating window 360 (or optionally a separate pop up window) may present alternative components (e.g. alternative gear sets) that may be interchanged with or substituted for the initial component provided with the item. As an example, user may have selected a bicycle that has a basic configuration with a standard gear. However, upon reading the component level reviews associated with the standard gear set, the user may not wish to purchase the bicycle and its basic configuration. Accordingly, the rating window 360 or a separate pop up window may present alternative/upgraded gear sets that may be substituted for the standard gear set along with reviews of alternative/upgraded gear sets.

As a further example, alternative/upgraded options for one component may be presented to the user through the rating window 360, such as when the rating associated with a particular component are low compared to other components of the same item. For example, the component level ratings for a majority of the components in the bicycle may be four or more stars, while only the standard gear set associated with the particular item on the received two stars. In this example, the rating window may present alternative component options for the gear set where the alternative gear sets received the same or similar rating (e.g. for or more stars) as the rest of the components in the bicycle. The user may then be afforded the opportunity to change gear sets (more generally substitute an alternative component) having a higher rating than the original component.

Additionally or alternatively, the user may be afforded an opportunity to make upgrades, such as switching to a higher rated gear set, without incurring additional charges, such as based on past customer loyalty or sales. For example, as a user makes multiple purchases, the user may accrue points or credits that may be exchanged for complete future purchases, as well as upgrades when switching between standard and alternative/upgraded components.

Additionally or alternatively, even after a user purchases an item, the system and method herein may track upgrade options to be presented as future accessory purchases or replacement purchases. For example, a user may purchase a standard bicycle with a standard gear set. Following the purchase, in alternative gear set may become available that consistently receives higher ratings than the standard gear set. The systems and methods herein may provide a follow-up communication (e.g. an email, text message and the like) to the user informing the user that an alternative component/gear set is available that has received higher component level ratings. The user may be afforded the opportunity to purchase the new gear set or exchange the standard gear set for an upgraded gear set at a discounted price.

In some embodiments, the illustration of the components and region designators 356A-G may be modified as the user moves a cursor over portions of the item 342. For example, when the cursor is placed over an individual component (or within a region designator 356A-G), the corresponding component may be illustrated in a magnified manner within the image window 350 or elsewhere on the display. Additionally or alternatively, when the cursor is placed over an individual component (or within a region designator 356A-G), the corresponding component may be highlighted, while the other components are dimmed or otherwise de-emphasized.

Figure 3D:
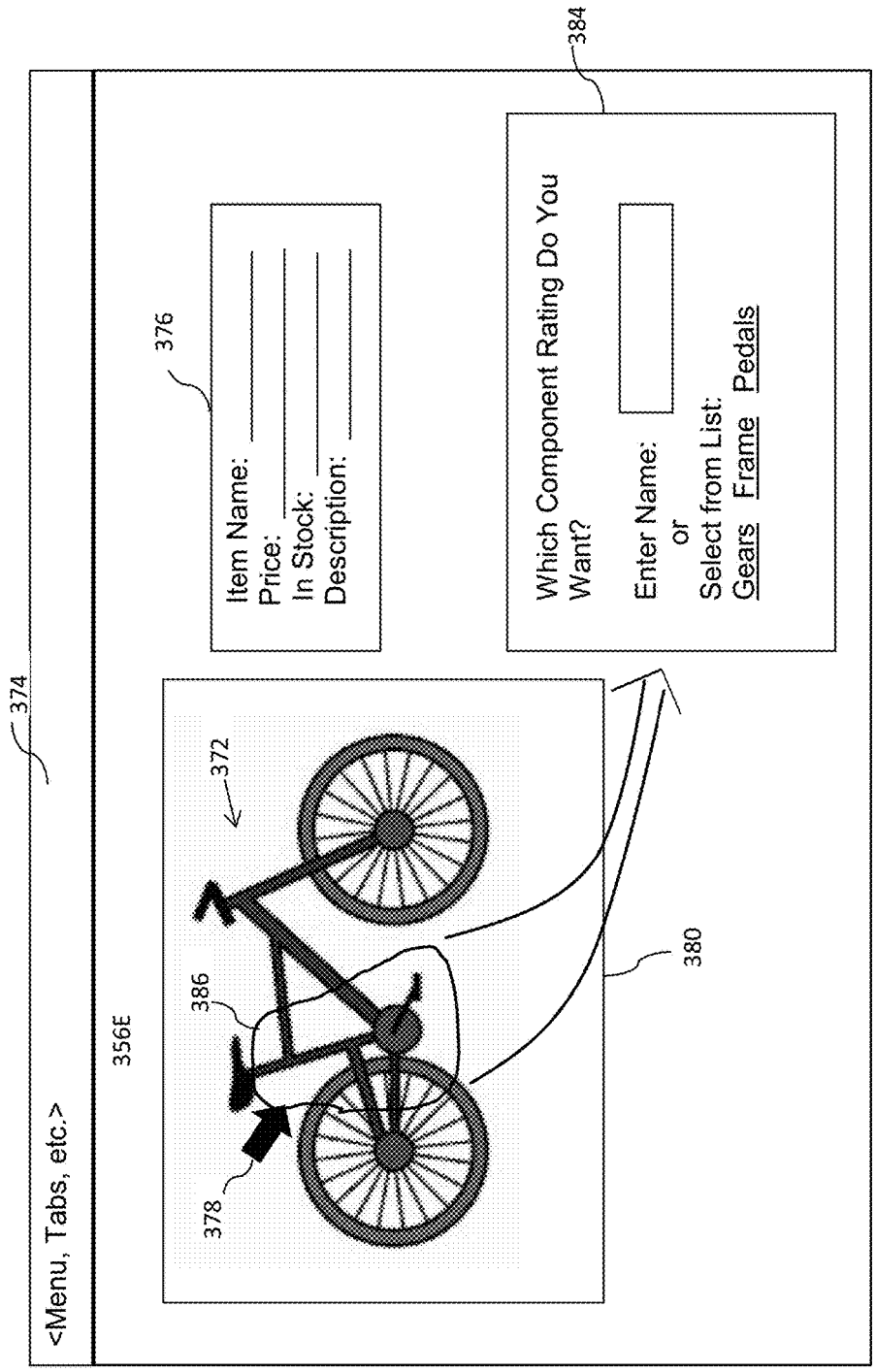
FIG. 3D illustrates an item page that presents component level ratings in accordance with embodiments herein.

FIG. 3D illustrates an item page 370 that presents component level ratings in accordance with embodiments herein. The item page 370 includes user interface elements 374, item information 376, and an image window 380, among other things. The image window 380 illustrates an image 372 of the item. In some embodiments, the systems and methods herein enable the user to designate one or more components of interest by using one or more user interface elements 374 to draw a region designator 386 on the image 372. For example, the user interface element 374 may represent the cursor 378, whereby the user maneuvers the cursor 378 about a region on the image 372 at least partially encompassing the component of interest. In the example of FIG. 3D, a free form region designator 386 has been drawn about a portion of the frame, the front (or drive) gear assembly, a portion of the back wheel and the pedals.

Once the region designator 386 is drawn about a select region (and any time multiple components are potentially being selected), in accordance with some embodiments, a component selection window 384 may be presented to prompt the user to identify which component rating the user desires (or which component to rate). The component selection window 384 may pop-up automatically or may open in response to a user input. The component selection window 384 may include an alphanumeric text entry window to permit the user to enter a name or other designator for a select component. Additionally or alternatively, the component selection window 384 may present a list of candidate components, where the list includes one or more of the components that are at least partially contained within or associated with the region designator 386. In the example of FIG. 3D, the list of optional components includes the gears, frame and pedals, from which the user may select. Once a component of interest is selected, rating information associated with the component is presented in a rating window, such as rating window 320, 360 (FIGS. 3B, 3C) or otherwise. Optionally, once a component of interest is selected, a rating entry window may be presented to enable the user to enter review content in connection with the selected component.

Optionally, the information collected in connection with drawing a region designator 386 may be provided as feedback to the system in connection with future identification of components in the same or similar items. For example, when the user draws the region designator 386 and then chooses to enter a component level rating for a bicycle frame, the system may use the corresponding feedback information for future reference to identify the frame as a component of interest when shapes similar to the region designator 386 are drawn by subsequent users. Additionally or alternatively, when the user holds the mouse over a particular portion of an item or draws a box around other portions of an item, followed by the user selection of a component to be rated, the system uses this feedback information to continuously learn and become more effective at identifying the component for which a user desires to enter or review ratings.

Figure 3E:
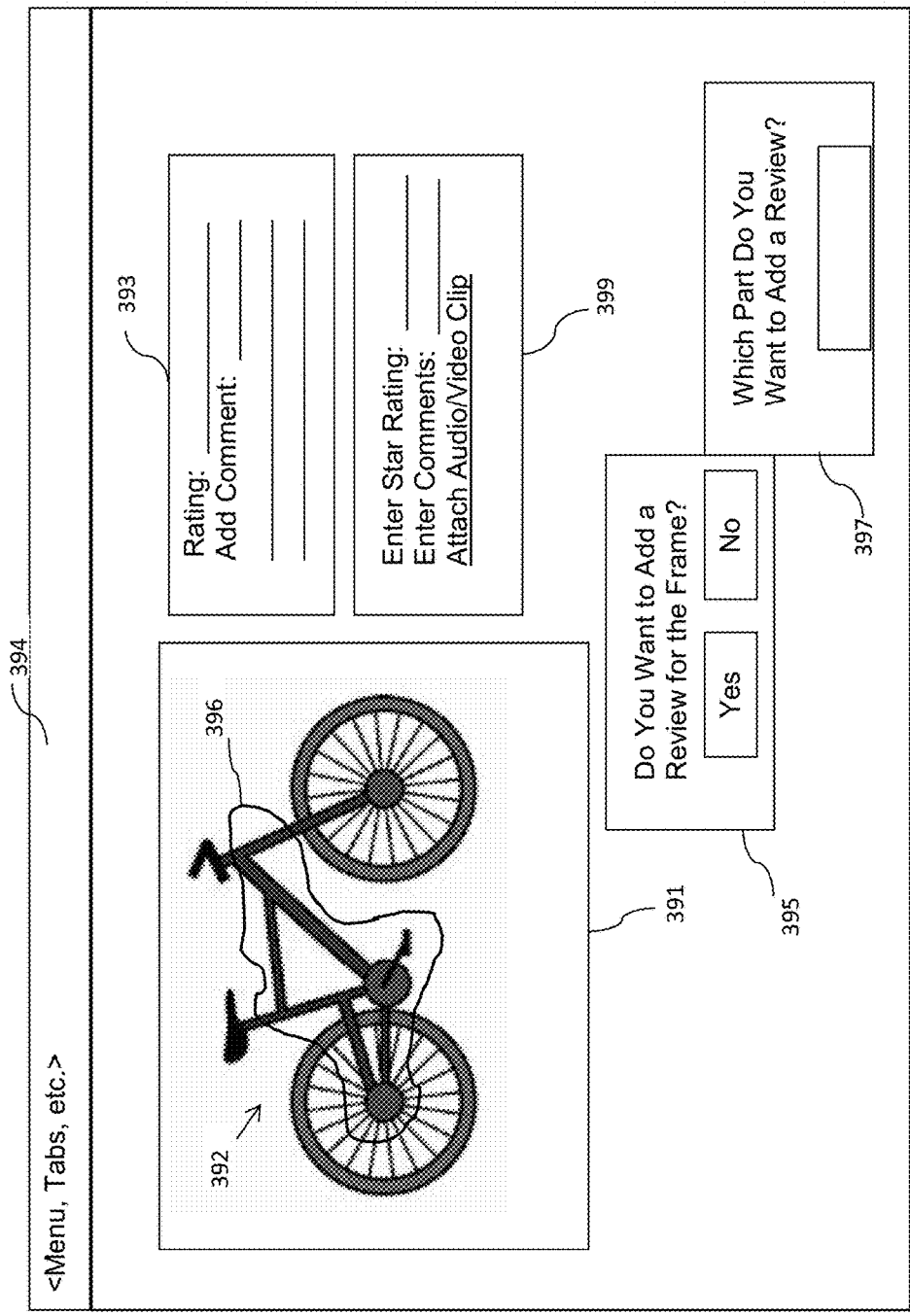
FIG. 3E illustrates an item page that may be presented in connection with entering component level reviews in accordance with embodiments herein.

FIG. 3E illustrates an item page 390 that may be presented in connection with entering component level reviews in accordance with embodiments herein. The item page 390 includes user interface elements 394, an image window 391, and item information 393. An image 392 is presented in the image window 391. The user interface of a computing device receives inputs from a user (e.g. through the keyboard, mouse and otherwise) to designate one or more components of interest from the image 392.

Optionally, the review request window 395 may be skipped when the region designator 396 indicates a single component (e.g. only surrounds a single component, is located within a single component or a majority of the region designator is encompassed by a single component).

In the example of FIG. 3E, the user has drawn a free-form region designator 396 using the mouse and cursor about various components in the item 392. Once the user selects the region designator 396 (or automatically upon completing the loop of the region designator 396), a review request window 395 is presented to question the user as to which component the user desires to rate. For example, the review request window 395 may present the question "Do you want to add a review for the frame?" followed by yes or no options. When the user enters a YES indication, a review content entry window 399 is presented. The review content entry window 399 permits the user to enter a standardized rating, text comments, and/or attach audio/video clips. The manner by which the user may be afforded to enter standardized ratings in window 399 may vary in accordance with the format described herein and otherwise.

Returning to window 395, when the user enters a NO indication that the frame is not the component for which the user wishes to enter a review, a component entry window 397 may be presented to query the user as to "Which part do you want to add a review?". Once the user enters the name of the component or selects the component from a list, the review content entry window 399 is presented to permit the user to enter review content in connection there with.

The examples illustrated in FIGS. 3A-3E illustrate components that are outwardly visible on the surface of the item. It is understood that the features and functionality described herein may be equally applied to components not visible in certain views or images of the item. For example, a cellular phone battery represents an internal component that is not visible from a view of an exterior of the phone. To afford easy selection of internal components, the image may be supplemented with additional views of primary internal components within the item. Accordingly, when an image of the cell phone is displayed, an image of the battery may also be displayed to enable the user to rate the battery life by selecting the image of the battery as a proxy for battery life. Supplemental images and/or names of particular components may be presented when such components are not visible from the outside of the product.

Additionally, an option may be presented on the user interface to animate assembly and disassembly of the item, such as to simulate removal of the exterior housing in order that the interior components are visible. The user would then be afforded the opportunity to select various internal components once the animated image has removed the housing. Additionally or alternatively, internal components may be illustrated in a dashed or shadow line as a hidden component through the housing with or without alphanumeric labels to identify the hidden components. The user would then select a hidden component to view the review content and/or enter review content. Additionally or alternatively, a list of component names may be presented next to the image of the item, where the list of component names includes components that are not readily visible from an overall exterior view of the item. The user would then be afforded the opportunity to select one or more of the component names to select the corresponding component to view or enter review content.

Optionally, the component level ratings may be returned as feedback to manufacturers, marketers, distributors and other businesses or individuals interested in the component for which the rating was provided, such as in order to provide improvements in the corresponding component or overall item. For example, the review content 118 (FIG. 1) may be returned to the content providers 106 periodically or on an ongoing basis in order to provide customer feedback regarding positive and negative aspects of the components and overall item. As a further example, the component level rating may be utilized as teaching or training information for employees of the manufacturers, marketers, distributors and other business entities or individuals. As one example, the item may represent art or a music product, where the components correspond to portions or aspects of the art or music. The component level ratings may be provided as feedback to the artist, producers or other interested individuals/businesses as an instructional tool (e.g., customers cannot understand aspects of a piece of art, the lyric in a song, the relevance of a section in a book, etc.).

Figure 4:
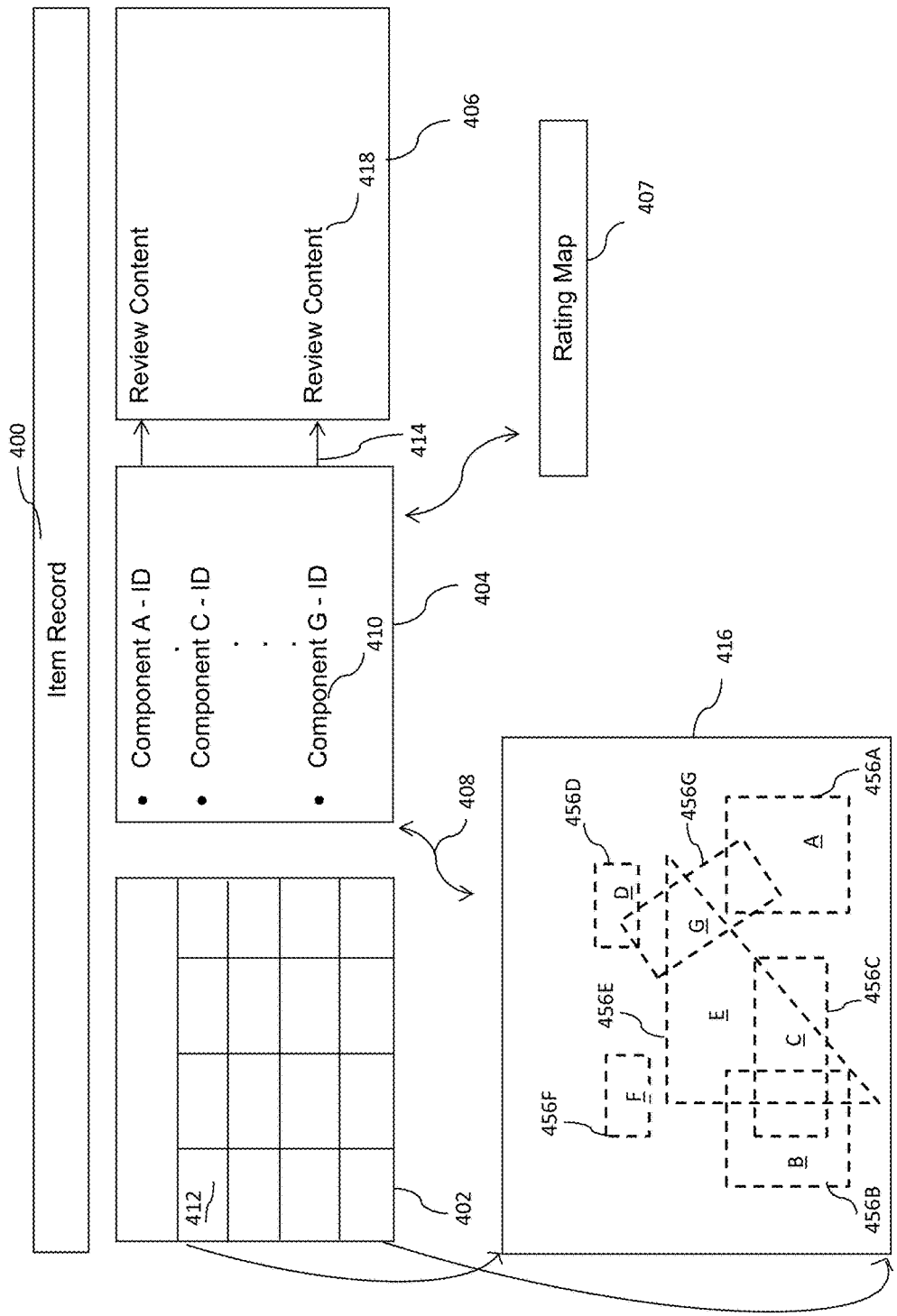
FIG. 4 illustrates an example format for an item record that stores various information and content in accordance with embodiments herein.

FIG. 4 illustrates an example format for an item record 400 that stores various information and content in accordance with embodiments herein. The item record 400 is associated with a single item and may be stored in the content data store 116 (FIG. 1), the item catalog 112, the memory 122 or elsewhere on a network. The item record 400 includes, among other things, an image file 402, a component map 404, review content collection 406, a rating map 407, a region indicator map 416, and other information and content related to the item. The image file 402 may store one or more 2D or 3D images of the item, one or more 3D models of the item, exploded views of the pieces and parts within the item and the like. The image file 402 stores one or more images of the item or portions of the item in various formats, such as a bit map or other known image format. Various known formats may be used to store the images formatted as 2-D images, 3D images, 3D models and the like.

A non-limiting list is provided below for examples of 3D graphics formats that may be utilized in accordance with embodiments herein: 3DMF—QuickDraw 3D Metafile (0.3dmf); 3DS, MAX—3D Studio Max Model (.max, 0.3ds); 3DT-3D Topicscape; ATY—3D Topicscape; AC—AC3D Model (.ac); AN8—Anim8 or Model (.an8); AOI—Art of Illusion Model (.aoi); B3D—Blitz3D Model (.b3d); BLEND—Blender (.blend); C4D—Cinema 4D (.c4d); Cal3D—Cal3D (cal3d); CAG—Linear Reference System; CFL—Compressed File Library (.cfl); COB—Caligari Object (.cob) CTM—OpenCTM (.ctm); DAE—COLLADA (.dae); DTS—Torque Game Engine (.dts); EGG—Panda3D Engine; FACT—Electric Image (.fac); FBX—Autodesk FBX (.fbx); FES—3D Topicscape; G—BRL-CAD geometry (.g); GLM—Ghoul Mesh (.glm); LWO—Lightwave Object (.lwo); LWS—Lightwave Scene (.lws); LXO—Luxology Modo (software) file (.lxo); MA—Autodesk Maya ASCII File (.ma); MB—Autodesk Maya Binary File (.mb); MD2—Quake 2 model format (.md2); MD3—Quake 3 model format (.md3); MDX—Blizzard Entertainment's own model format (.mdx); MESH—New York University (.m); MESH—Meshwork Model (.mesh); MM3D—Misfit Model 3d (.mm3d); MM—FreeMind mind map file (XML); MMP—Mind Manager mind map file; TPC—3D Topicscape; NIF—Gamebryo NetImmerse File (.nif); OBJ—OBJ (.obj); OFF—OFF Object file format (.off); PRC—Adobe PRC (embedded in PDF files); POV—POV-Ray Document (.pov); RWX—RenderWare Object (.rwx); SIA—Nevercenter Silo Object (.sia); SIB—Nevercenter Silo Object (.sib); ANEE—3D Flash Gallery Model [1] (.u3d); SKP—Google Sketchup file (.skp); SLDASM—SolidWorks Assembly Document (.sldasm); SLDPRT—SolidWorks Part Document (.sldprt); SMD—Valve's format. (.smd); U3D—Universal 3D file format (.u3d).

The image file 402 is partitioned into image areas 412, each area of which comprises one or more pixels or subsections of pixels. The region indicator map 416 corresponds to and is relationally overlaid upon the image file 402, such that the image areas 412 are associated in a one-to-one relation with regions within the region indicator map 416.

The region indicator map 416 includes component boundaries 456A-G stored in connection with each ratable component of interest. In the example of FIGS. 4 and 3C, the component boundaries 456A-G correspond to the region indicators 356A-G. The component boundaries 456A-G may be manually designated, or machine determined by analyzing one or more images of the item.

The component map 404 includes a list of component IDs 410 uniquely associated with each component within the item for which separate customer review content has been stored or may be stored. The component map 404 also includes links 408 associating each region boundary 456A-G (and image area 412) to a corresponding one or more component IDs 410. In the example of FIG. 4, for illustration purposes, the regions within component boundaries 456A-G are lettered A through G, each of which has a link 408 to a corresponding component A-ID-G-ID. In the example of FIG. 4, the component A-ID is mapped/linked to region boundary 456A which corresponds to the front tire of the bicycle and by way of example may correspond to image areas 412 in the lower left corner of the image file 402. The component G-ID is mapped/linked to region boundary 456G which, by way of example, may correspond to a diagonal line of image areas 412. The region boundaries 456A-456G may take various shapes, such as to more closely follow the contour of the related component or any other free-form shape.

The component map 404 also includes links 414 that map each component ID to corresponding review content 418 in the review content collection 406. The review content 418 includes the individual and aggregate ratings, comments and reviews, as well as other content that provides objective and/or subjective feedback regarding the related component (e.g. feedback related to reliability, performance, ease of use, aesthetic appearance, durability, etc.).

The rating map 407 includes graphical information associated with each component ID 410, where the graphical information may be displayed adjacent to, overlaid upon or otherwise relative to the associated component. The graphical information is representative of feedback provided through prior customer reviews. For example, the graphical information may represent unique colors along a color scale, where each color is associated a standardized rating along a rating scale. For example, components having numerous high or very positive ratings may be overlaid with a select color or shade, such as green or a dark color, to indicate that the associated component was highly regarded in feedback from customers. Similarly, components having numerous low or very negative ratings may be overlapped with another color or shade, such as red or a light color, to indicate that the associated component was negatively regarded in feedback from customers.

It is recognized that the structure illustrated in FIG. 4 for an item record 400 represents merely one example of a structure. Numerous alternative data structures may be utilized to associate components of an item with review content. For example, when 3-D models are utilized, the review content may be directly associated with points, portions or components within the 3-D model without the use of region indicator maps, component maps, image files and the like.

Flow diagrams of example processes are now described to facilitate entry and review of component level ratings in connection with discrete components of an item. Each process is illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process.

Figure 5:
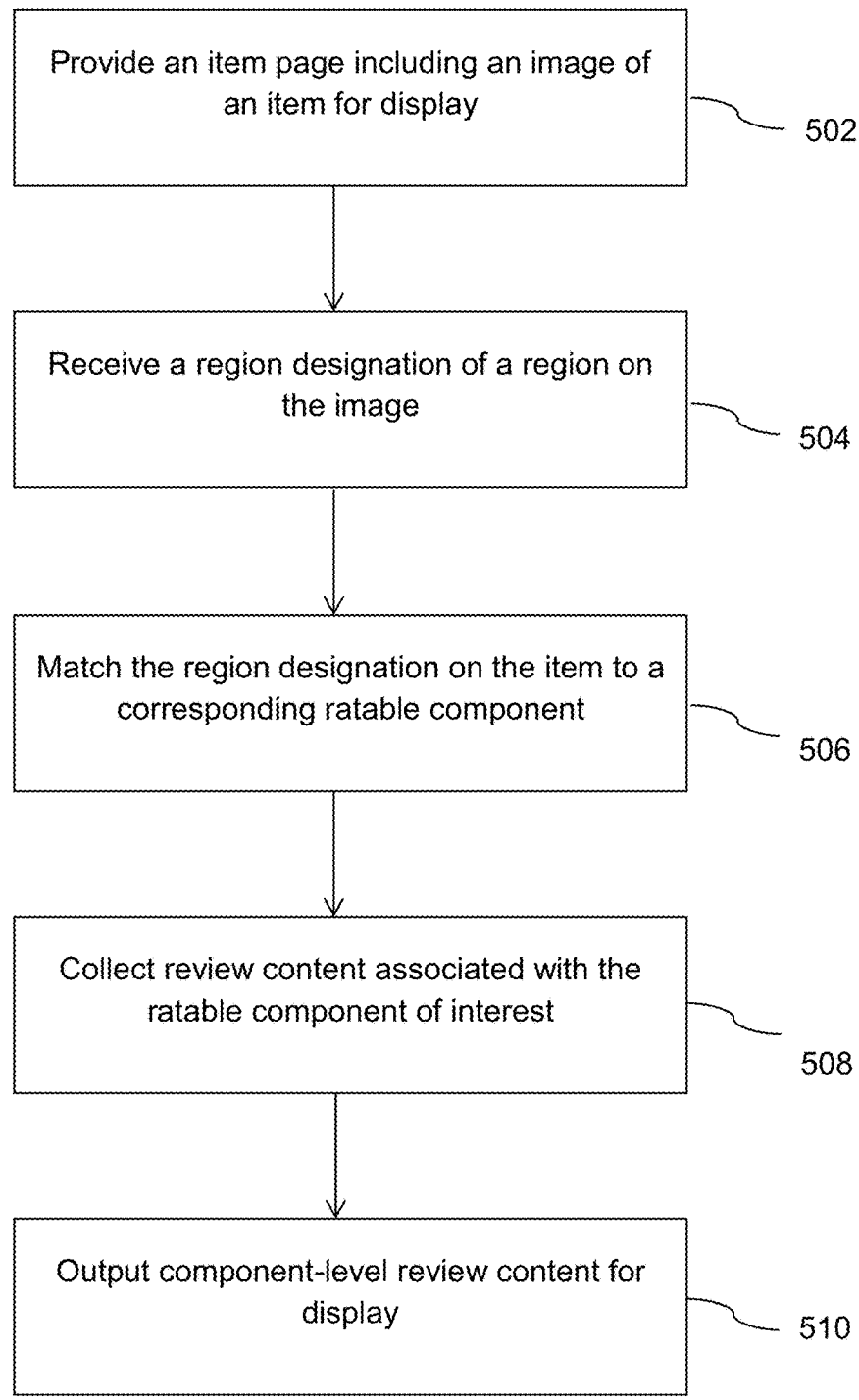
FIG. 5 illustrates a process for reviewing component level ratings entered in connection with customer reviews for an item in accordance with embodiments herein.

FIG. 5 illustrates a process for reviewing component level ratings entered in connection with customer reviews for an item in accordance with embodiments herein. The process of FIG. 5 will be described in connection with the user interface illustrated in FIGS. 3A-3E.

At 502, the process provides an item page 300 including an image 302 of an item for display on a computing device. For example, the item is displayed in response to an item request created by a user via a computing device 104. The item request may be received by the content provider 106, in response to which the content provider 106 returns an item record including an image of the item to a user interface of the computing device 104. It is recognized, that leading up to the provision of the image of the item, various operations may be implemented by the computing device 104 and/or content provider 106 in accordance with existing techniques and protocols for implementing e-commerce through websites. The image 302 of the item is provided to the user such as by displaying the image 302 on a display of the computing device 104.

At 504, the process then receives, from the user, a region designation of a region on the image 302 corresponding to a component of interest from the item. By way of example, the region designation may be entered as a response to holding the cursor 308 over a component of interest, after which the region designator 316 is displayed. The region associated with the region designator 316 may automatically be processed as the designated region at 504. Optionally, the process may wait for the user to enter an additional input/command to indicate that the region designator 316 corresponds to the region for which the user wishes to enter a designation (e.g. mouse click or keyboard entry). Additionally or alternatively, the region designation may be generated when, and in response to, the user selects the component level review tab 314 (FIG. 1) and subsequently enters a component name or selecting a component of interest from the list displayed in the component selection window 327. As explained above, the list of available components may be designated manually or automatically through various imaging and text analysis techniques of product information, prior reviews and the like. Additionally or alternatively, the region designation may be generated when, and in response to, the user selects one of the region indicators 356A-G (FIG. 3C), and/or one of the ratings 362. Additionally or alternatively, the region designation may be generated when the region designator 386 (FIG. 3D) is drawn about the item 372. Optionally, the region designation may be generated in other manners as well.

At 506, the process matches the region designation on the item to a corresponding ratable component. By way of example, with respect to FIG. 5, the process may analyze the image file 402 to identify image areas 412 that correspond to a region designated by the user. By way of example, the region may be designated when the user holds the cursor 308 (FIG. 3A) over a component on the image 302 or draws a region designator 386 (FIG. 3D) about one or more components. Once the process determines which image areas 412 (FIG. 4) that fall within or at least partially overlap the region designated by the user, the process then identifies one or more corresponding component boundaries 456A-G. Image recognition software may be used solely or in combination with user feedback to identify and generate the component boundaries 456A-G. In the example of FIGS. 4 and 3A, when the user holds the cursor 308 over the front gear assembly, the process determines that the image area 412 associated with the cursor 308 falls within the region boundary 456C associated with the gear assembly. Accordingly, the process uses the links 408 to match the region designated with a corresponding ratable component by identifying the ratable component of interest to be component C-ID (the gear assembly).

At 508, the process collects review content associated with the ratable component identified at 506. Continuing with the example of FIG. 4, the process retrieves the content review 418 associated with component C-ID. The content review 418 for component C-ID is designated by the link 414.

At 510, the process outputs all or a portion of the content review 418 for display in association with the designated region. In some embodiments, output of content review 418 may include the display of component level ratings, such as one or more stars, on the display of a computing device. The component level ratings may be displayed on, or adjacent to, the corresponding component (e.g. on the image areas 412 associated with the component). As another example, component level ratings and comments may be presented in a rating window (e.g., rating window 320 in FIG. 3B). When the content review 418 includes audio or video clips that include customer review content, the audio or video clip may be automatically played without further user input. Alternatively, a link to the audio or video clip may be presented on the display, such as proximate to the associated component or within a rating window, or elsewhere. The content review 418 may be displayed in various formats other than the manner described and illustrated in connection with FIGS. 3A-3E.

The process of FIG. 5 may be repeated continuously in connection with one or more users as the user(s) selects different components of interest from the item. The process of FIG. 5 may also be repeated numerous times as one or more users select different items.

In embodiments discussed herein, the component of interest is identified based on presentation of an image of an item on an item page through a user interface of a computing device. Additionally or alternatively, a component of interest may be identified in other manners without first presenting an image of the item through a user interface. FIG. 2 illustrates a computing device 104 configured to capture information to identify an item or component of interest in accordance with embodiments herein. For example, a camera within the computing device 104 may be used to collect a photograph or video of an item and/or a component of interest from an item. As another example, the computing device 104 may take a photograph or scan a barcode, product name or other product identification content on an item, on an advertisement or other marketing literature identifying the item, and/or a container holding the item. In the event that a barcode, product name or other identification content is provided that identifies individual components of an item, the computing device 104 may also be used to take photographs or scan such material.

The computing device 104 passes the photograph, video or scan of the item, component of interest, barcode, product name, or other identification content to a content provider 106, server or other networked computer system to be analyzed and identified. Alternatively or additionally, the computing device 104 may include image recognition software that enables the computing device to locally analyze and identify the item or component of interest within the photograph, video or scan of the item, component of interest, barcode, product name, or other identification content.

When the photograph or video corresponds to one or more individual components of interest, the operations discussed herein at 504-510 (FIG. 5) may be repeated to identify individual component IDs, as well as content review related to the individual components of interest. Additionally or alternatively, when the photograph or video correspond to an overall item having numerous components of interest, the item captured in the photo/video is first identified through image recognition software (operating locally on the computing device and/or operating remotely on a server or other computer-based network). Optionally, the computing device may display a window identifying one or more candidate items that have been identified by the image recognition software and prompting the user to select one of the candidate items as an item of interest. Once an item of interest is identified, the operations discussed at 502-510 (FIG. 5) may be used to enable the user to select one or more components of interest.

Figure 6:
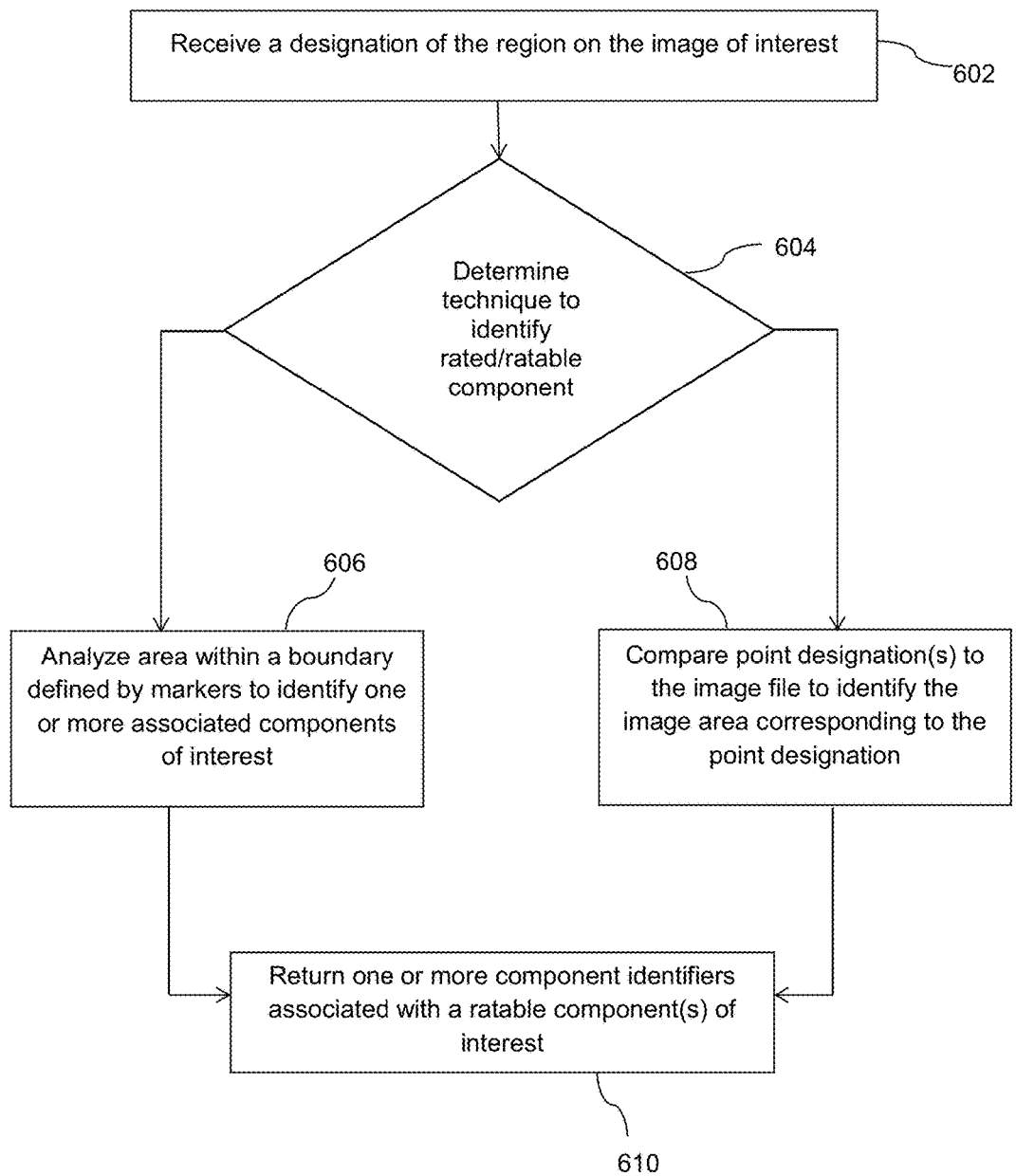
FIG. 6 illustrates a more detailed process carried out during the operation in FIG. 5, to match area designations with rated components in accordance with embodiments herein.

FIG. 6 illustrates a more detailed process carried out during the operation at 506 in FIG. 5, to match area designations with rated components in accordance with embodiments herein. All or a portion of the operations in FIG. 6 may be carried out during the matching operation performed at 506.

At 602, the process receives a designation of the region on the image for which the user is interested in entering a customer rating or for which the user is interested in viewing review content.

At 604, the process determines which technique to use to identify the rated/ratable component. The determination may be based on the nature of the information entered by the user, based on predefined parameters of the system and the like. For example, at 604 the process may determine what information has been entered by the user, such as a single point marker or a collection of markers sufficient to define a line, arc or closed loop. For example, as in the embodiment of FIG. 3D, the cursor 378 may be used to draw a region designator 386 that define a closed perimeter. A region designator 386 drawn by the user for a partially or fully closed perimeter, may be defined by multiple markers positioned about the region designator 386. When multiple markers or other information is received that designates a closed region designator 386, flow branches to 608.

At 608, the process analyzes the area within a boundary defined by the markers to identify one or more associated components of interest. For example, the process may access the region indicator map 416 (FIG. 4) and identify one or more region indicators 456A-G that correspond to image areas 412 that include, or are enclosed within, a box boundary defined by the markers at 606. By way of example, when the markers correspond to a central portion of the bicycle at 608 the process would determine that the markers correspond to one or more of the frame and gear assembly. Accordingly, at 608, one or more component IDs would be identified to correspond to the markers.

In accordance with some embodiments, as explained in connection with FIG. 3A, the user may simply hold the cursor 308 over a component of interest, or position the cursor 308 over a component of interest and single click. When the user holds the cursor 308 over a component of interest for a predetermined time (or uses the cursor 308 to enter a selection), the process generates a cursor location marker (e.g., an X,Y coordinate, a pixel number, etc.) that represent a point designation. The point designation indicates a present location of the cursor 308 relative to a reference point and reference coordinate system of the image. Returning to 604, when a cursor location marker is returned that corresponds to a single point, insufficient information has been returned to form a user defined bounded box. Thus, when a point designation for a cursor location is returned, flow branches to 608. Optionally, flow may branch to 608 in other situations, when more than a single point designation is received.

At 608, the process compares the point designation(s) to the image file 402 to identify the image area 412 corresponding to the point designation. Once an image area 412 is identified, the region indicator map 416 is reviewed to determine whether the image area 412 overlaps one or more region indicators 456A-F. For example, when the cursor is used to designate a point on the handlebars, the corresponding image area 412 is identified, as is the corresponding region indicator 456D. From the region indicator 456D, link 408 is used to identify the component ID 410 for the handlebars from the component map 404.

At 610, the process returns one or more component identifiers associated with the component(s) on the item identified at 606 and/or at 608, and flow returns to FIG. 5. The process of FIG. 6 represents examples of some techniques for identifying individual components of interest from an item based on various types of user entries and based on different levels of machine-based analysis of the content of the images. It is recognized that other techniques may be used in accordance with embodiments herein to convert user inputs through a graphical user interface into component identification.

Figure 7:
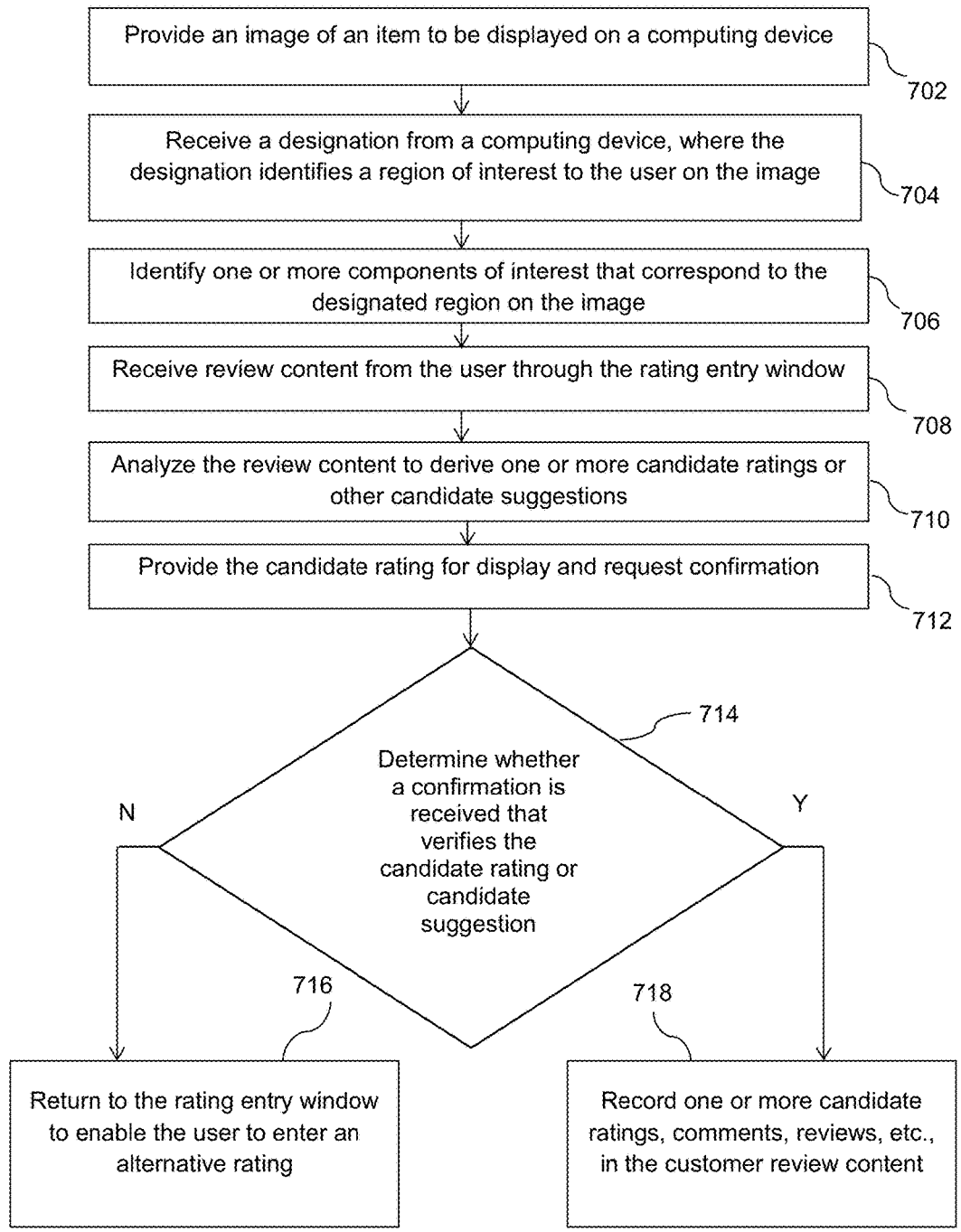
FIG. 7 illustrates a process for entering customer reviews for components of interest in accordance with embodiments herein.
Figure 8:
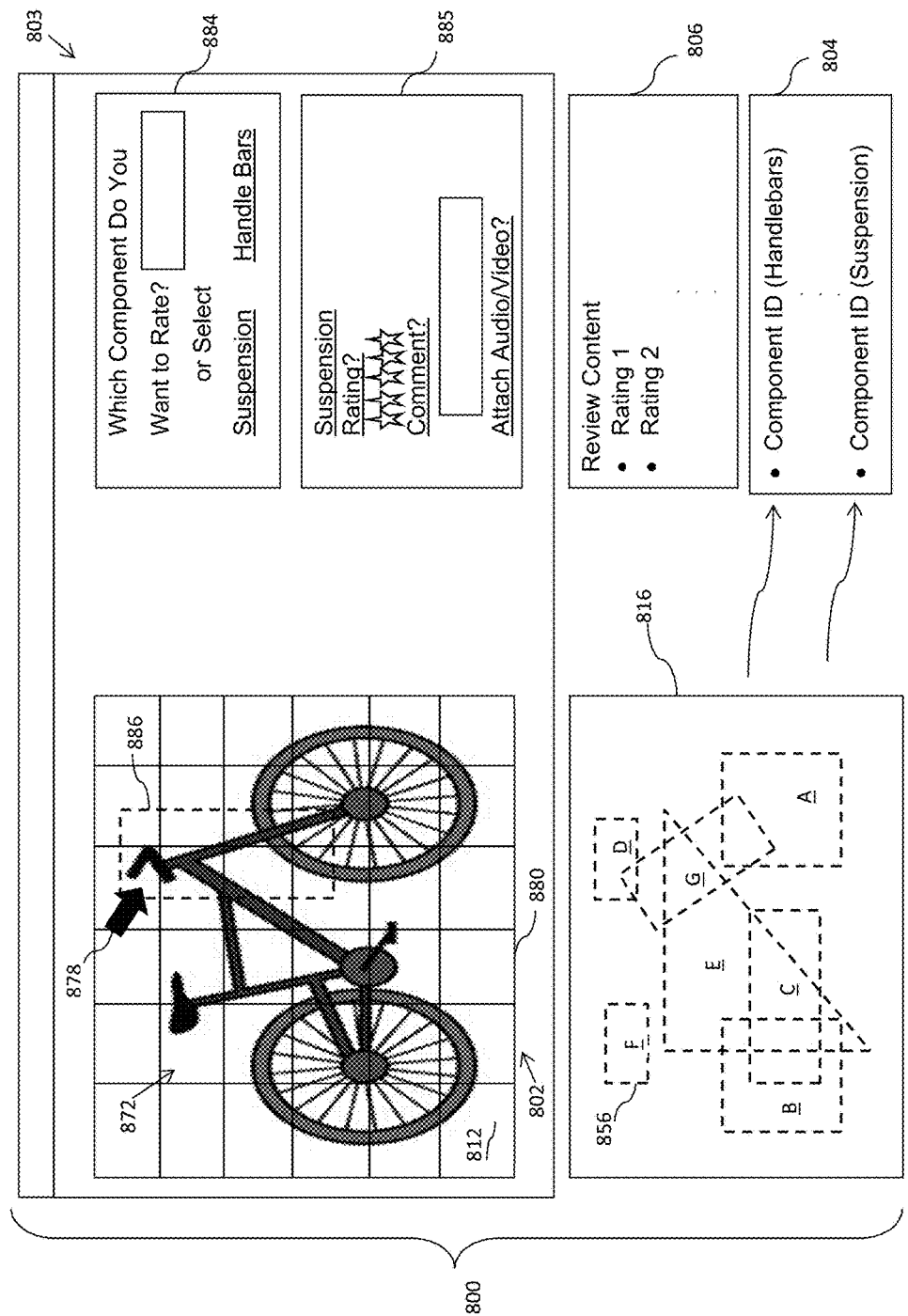
FIG. 8 illustrates, in the upper portion, examples of windows from a user interface that may be presented to the use on a display as part of the user interface.

FIG. 7 illustrates a process for entering customer reviews for components of interest in accordance with embodiments herein. By way of example, at some predetermined period of time after a user buys or otherwise obtains an item, a request may be sent to the user to request feedback including a customer review. The operations of FIG. 7 are described below in connection with FIG. 8. FIG. 8 illustrates, in the upper portion, examples of windows from a user interface 803 that may be presented to the use on a display as part of the user interface. FIG. 8 also illustrates portions of one example of an architecture for an item record.

At 702, the process provides an image of an item to be displayed on a display of a computing device. For example, with reference to FIG. 8, an image 872 is provided to be displayed in image window 880. FIG. 8 also illustrates an image file 802 superimposed on the image window 880 such that image areas 812 are illustrated in correspondence with the item 872. It is recognized that the grid structure for the individual image areas 812 is for illustration purposes, and may or may not be displayed to users in the image window 880.

At 704, the process receives a designation from the user through the graphical user interface of a computing device, where the designation identifies a region of interest to the user on the image 872. For example, a cursor 878 may be used to draw a partially or fully closed box about a region of interest, such as denoted by user-designated box 886. Markers or other information may be generated that define the position, shape and size of the user-designated box 886.

While the box 886 is illustrated to be rectangular, it is recognized that various predetermined shapes may be utilized where the cursor 878 may be used to adjust the position, orientation and size of the predetermined shape. Alternatively or additionally, the box 886 may have a shape that is not predetermined, such as when the user is permitted to draw a free-form shape by tracing the cursor 878 along any path within the image 880.

FIG. 8 also illustrates, in the lower portion, portions of an item record 800, namely a component map 804, a region indicator map 816, and review content 806. The item record 800 may include similar content to the item record 400 as described above in connection with FIG. 5. The maps 804, 816 and review content 806 may be constructed similar to the maps 404 and 416, and the review content collection 406 of FIG. 4.

At 706, the process identifies one or more components of interest that correspond to the designated region on the image 872. For example, with reference to FIG. 8, the markers that identify the user-designated box 886 are used to identify corresponding image areas 812. The image areas 812 within the user-designated box 886 are mapped to corresponding component boundaries 856A-G. In the example of FIG. 8, the process determines that the user-designated box 886 overlaps component boundaries 856D and 856G that correspond to the handlebars and the suspension system. The process then identifies one or more component IDs from the component map 804 that are associated with the component boundaries 856D and 856G. The process displays information related to the components corresponding to component boundaries 856D and 856G. For example, prior reviews by other customers may be displayed.

In some embodiments, the displayed information related to the components is presented in a component selection window 884 to prompt the user to select one or more components that the user desires to rate. For example, the component selection window 884 may pose the question "Which component do you want to rate?". The component collection window 884 may also present a data entry box to permit the user to enter alphanumeric text identifying the component to be rated. Additionally or alternatively, a list of candidate components may be presented in the component selection window 884. Once the user enters the name of a component and/or selects one of the candidate components listed, in response thereto, a rating entry window 885 is presented. The rating entry window 885 enables the user to enter various review content such as a standardized (e.g., star based) rating, comments, an audio clip reviewing the component, a video clip reviewing the component and the like.

The question and list of candidates posed in the component selection window 884 are presented when the user designates more than one component, such as by drawing a user-designated box 886 that encompasses more than one component. Optionally, the component selection window 884 may be omitted when the user-designated box 886 includes only a single component, such as the handlebars or the front suspension system.

At 708, the process receives review content from the user through the rating entry window 885. The process analyzes the review content such as to determine what rating was entered and/or to determine whether any rating was entered. The process may also parse through and analyze the text, audio content and video content of the review content, such as to assess the nature of the feedback. For example, the process may determine whether the user is providing positive or negative feedback concerning the component of interest. The process may determine a degree to which the feedback is positive or negative (e.g. neutral, highly positive/negative, slightly positive/negative). The process may also analyze the text, audio and video content in order to assess whether the review content is appropriate (e.g. whether the comments, audio, video use strong language, adult content, or are otherwise inappropriate for children to review).

In some embodiments, the user may not wish to enter comments, but instead simply enter a star rating and nothing more. To facilitate entry of star ratings alone, in the example of FIG. 8, the component rating window 885 is presented with an easy manner for selecting a rating value. For example, the user may click on the number of stars that the user desires to enter. Optionally, the user may click and drag to select a group of stars. The text box for comments allows the user to enter additional information to reinforce the customer sentiment about the component. The component level review entered by the user is stored together with other component level reviews and any system level reviews of the overall item.

Various text, audio and video analysis techniques may be used to analyze the review content. For example, in some embodiments, text review content may be analyzed to identify keywords and phrases (text or spoken) that have been previously used in other reviews and/or otherwise classified to correspond to very positive, positive, neutral, negative, or very negative feedback. The keywords and phrases of the review content may also be analyzed to determine whether the comments apply to the component identified to be rated. For example, when the comments refer to the "gears" or "seat", but the component under review is the handlebars, the process may identify a discrepancy and seek to confirm that the appropriate component is being reviewed (e.g., through a component confirmation window).

Based on the analysis of the text, audio and video, the process determines whether the review content entered by the user is to be verified. For example, the user may enter comments, but may not enter a rating. When no rating is entered, the process may seek to suggest a rating to the user based on the text, audio, video comments. As another example, the user may enter very positive comments and enter a very negative rating, or vice versa. When the review content is incomplete, inconsistent or otherwise warrants verification, flow moves to 708.

When the user enters a rating and the rating appears to be consistent with the comments entered by the user, no further verification may be warranted and flow moves to 714. The customer may enter more than one review at different points in time related to a particular component. Each review entered by a user is assigned a time marker denoting the point in time at which the review is provided. When a single customer enters multiple reviews at different points in time, each review by the common customer is separately marked with a time stamp to maintain time-based ratings.

At 710, the process analyzes the review content to derive one or more candidate ratings or other candidate suggestion. For example, when the comments use very positive or very negative words, an appropriate rating may be suggested to the user (e.g., "Based on your comments, would you want to give the handlebars a 3 star rating?"). When the comments do not appear to apply to the component, a confirmation request may be presented ("Did you want to rate the gears instead of the handlebars?").

At 712, the process provides the candidate rating for display and requests confirmation. At 714, the process determines whether a confirmation is received that verifies the candidate rating or candidate suggestion. When a confirmation is received, flow moves to 718. Alternatively, when a rejection is received, flow moves to 716. At 716, the process returns to the rating entry window 985 to enable the user to enter an alternative rating.

At 716, the process records one or more candidate ratings, comments, reviews, etc., in the review content 806. The review content 806 may also include time markers denoting the point in time at which a review is provided.

In accordance with embodiments herein, the user may dictate the review content. The process utilizes any of several conventional speech recognition software packages to convert the dictation of the review content to text. The process also analyzes, as explained above, the speech and/or text to identify keywords and phrases, from which recommendations may be offered to the user for a rating level, based upon a standardized rating scale. For example, the process may listen while the user speaks an audio review, and respond by adding the standardized rating at a level deemed appropriate based upon the spoken audio review.

In accordance with embodiments herein, the speech recognition software may also analyze voice inflection and audible emphasis in the speech in connection with making recommendations for a rating level. For example, when a user sounds animated, excited or otherwise exhibits strong emotion in connection with providing an audio review, the process may suggest a higher or lower rating than the wording within the review may otherwise suggest.

In accordance with the process of FIG. 7, a user is afforded the opportunity to enter component level ratings, including standardized or normalized ratings, comments, audio and video clips and the like. The user's entries are analyzed at the time of entry to try to fill in blanks that the user may leave and to determine whether the user's entries are internally consistent. When gaps or inconsistencies are noted, the user is prompted to clarify or to confirm that the gap or inconsistency is intended.

In accordance with embodiments herein, the process of FIG. 7 may also enable component segmentation to be changed based on user feedback. For example, operations may be added to the process of FIG. 7 to afford a product level manager or end user the option to change the borders separating the components. For example, the manager or user may enter a request to view one or more of the component boundaries 856A-G. In response, one or more of the component boundaries 856A-G are superimposed over the image 872. The manager or user may then adjust a select component boundary 856A-G with the cursor 878, such as by clicking and dragging the select component boundary 856A-G in a desired manner until the select component boundary 856A-G has a desired size, shape, position and orientation. In accordance with embodiments herein, image recognition software in addition to or as an alternative to user feedback, may be used to identify and generate the component boundaries 856A-G.

In accordance with embodiments herein, an "ask/answer feature" may be provided in connection with entry of review content by users. For example, when a user enters a review, the user may also enter questions (or answer prior questions) concerning the component or overall item. For example, the questions may relate to assembly, maintenance, individual settings and the like. The questions are saved in the content review as part of the review content. Subsequent reviews entered by other users may also utilize the ask/answer feature to answer prior questions and pose new questions.

Figure 9:
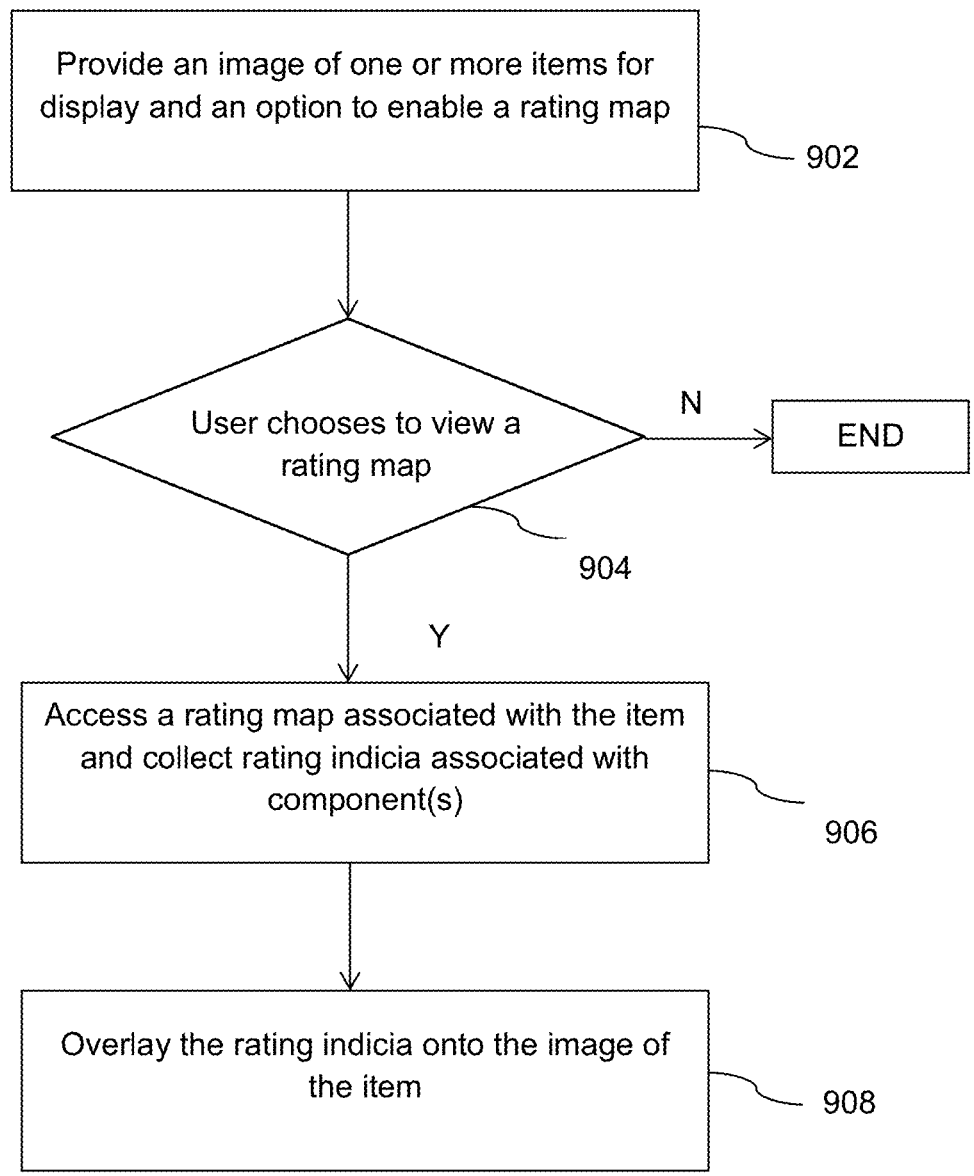
FIG. 9 illustrates a process for displaying rating maps overlaid with components of interest in accordance with embodiments herein.

FIG. 9 illustrates a process for displaying rating maps overlaid with components of interest in accordance with embodiments herein. The operations of FIG. 9 will be described in connection with the illustration of FIG. 10.

At 902, the process provides an image of one or more items for display and an option to enable a rating map. At 904, the process determines whether the user has chosen to view a rating map. When the user chooses to view the rating map, flow moves to 906, otherwise the process ends. At 906, the process accesses a rating map associated with the item and collects rating indicia associated with component(s) of the item. At 908, the process overlays the rating indicia from the rating map onto the image of the item.

FIG. 10 illustrates an item page 1040 with a rating map that may be presented in accordance with various embodiments. The item page 1040 includes user interface elements 1044, an image window 1050 (that illustrates one or more images 1042), item information 1046 and a rating window 1060. In the example of FIG. 10, the image window 1050 concurrently overlays a heat rating map onto the image 1042. The image window 1050 includes component boundaries 1056A-G surrounding each of the components of interest in the item 1042. For example, component boundaries 1056A, B designate and correspond to the wheels, while component boundary 1056C designates and corresponds to the gears, chain and pedals. Component boundaries 1056D, E, F and G designate and correspond to the handlebars, frame, seat and the front suspension system, respectively. It is understood that the component boundaries 1056A-G are by example only and that alternative and/or additional component boundaries associated with other components may be utilized.

The component boundaries 1056A-G include graphical indicia that indicate a standardized rating assigned to the corresponding component. The standardized rating for an individual component may represent an aggregate rating based on multiple ratings from various customers in connection with the corresponding component. Optionally, the standardized rating for an individual component may correspond to one or various combinations of prior ratings, such as a most recent rating, a top 10 ratings, a bottom 10 rating, ratings during the last month or year and the like. The graphical indicia may represent various formats used to designate points along a standardized scale, such as color coding, different hashing patterns, and/or another format to graphically or otherwise visually and/or audibly indicate a rating.

A rating key 1051 is provided proximate to the image page 1050. The rating key 1051 indicates a correlation of the level within the standardized rating scale and the graphical indicia. For example, a one star rating may correspond to the color red or a speckle hashed or shaded pattern, while a five-star rating may correspond to the color green or a darkly shaded pattern.

In some embodiments, the customer may utilize a computing device to navigate to an item page. The item page provides an option for enabling a rating map (e.g., a rating map) of the item. The rating map comprises, among other things, a scale for determining the rating, and a translucent rating map overlaid on top of the image of the item. By way of example, the scale may be a gradient that is quantized to one decimal point. For example, there may be 41 (1.0-5.0 in 0.1 increments) unique colors. The colors may be chosen in such a way that major increments in the rating are easy to distinguish from each other. The rating map is stored in the content data store 116 and/or item catalog 112 and/or memory 122 in a mapped relation with the image of the item.

The rating map may represent an aggregate of all prior user ratings. An item that is not rating map enabled will have an overlay fill of the color corresponding to the average rating for all of the components.

In some embodiments, more or fewer than a five star rating system may be utilized. Embodiments may be provided in which users provide ratings based on a binary or two level rating system. When a two level rating system is used, the rating map may include indicia only to identify the components that received overwhelming population "liked" or "disliked" rating. For example, when 75% or more of the reviews for a component were "liked", the component may be shaded in green. When 75% or more of the reviews for a component represent a "disliked" rating, the component may be shaded in red. Another metric besides a percentage may be used. Components that do not receive a large number of "liked" or "disliked" ratings may be presented with a neutral indicia (e.g. white background) or without any indicia.

In some embodiments, a retrofit configuration may be implemented in connection with a wide assortment of images that already exist. The existing images can be retrofitted with the scaling map (rating map) overlays. A vendor may choose whether or not to have the rating map enabled for a given image.

In some embodiments, vendors (or algorithms) may be permitted to mark components available for rating. For example, the vendor or an image recognition algorithm may be used to analyze images of an item. The vendor or image recognition algorithm may select only one or a subset of images related to an item from a larger collection of images to enable the item to be displayed in the image from desirable perspectives. The rating map areas have 1:1 mapping with the component of the underlying item.

In some embodiments, the items are displayed in three dimensions in order to enable a buyer to navigate the item in 3D space using a mouse and keyboard to see which components of the item were rated favorably or negatively.

The examples discussed above are generally in the context of electromechanical tangible products. However, it is understood that the methods and systems described herein may be used with numerous other items, whether tangible or intangible. As an example, embodiment may be implemented to view and enter review content in connection with digital products. The digital product may be broken into corresponding non-physical components where visual representations are illustrated for each of the nonphysical components. For example, icons may be presented for each nonphysical component.

As an example, music may be visualized through a standardized chart, where a line represents the time axis. The user may select a "component" of interest (corresponding to a segment or audio clip from the song). The user may enter review content in connection with the audio segment and/or review pre-existing review content associated there with. As another example, movies may be visualized through a standardized chart, where a line represents the time axis. The user may select segments or video clips from the movie as "a component" of interest. The user may then enter review content in connection with the video segment and/or review pre-existing review content associated therewith. The user may use the review content when searching for digital goods, such as games, songs or music. For example, the user may desire to only view games, songs or music, for which no segment has a rating of less than three stars.

In accordance with at least one embodiment herein, to the extent that mobile devices are discussed herein, it should be understood that they can represent a very wide range of devices, applicable to a very wide range of settings. Thus, by way of illustrative and non-restrictive examples, such devices and/or settings can include mobile telephones, tablet computers, and other portable computers such as portable laptop computers. As will be appreciated by one skilled in the art, various aspects may be embodied as a system, method or computer (device) program product. Accordingly, aspects may take the form of an entirely hardware embodiment or an embodiment including hardware and software that may all generally be referred to herein as a "circuit," "module" or "system." Furthermore, aspects may take the form of a computer (device) program product embodied in one or more computer (device) readable storage medium(s) having computer (device) readable program code embodied thereon.

Any combination of one or more non-signal computer (device) readable medium(s) may be utilized. The non-signal medium may be a storage medium. A storage medium may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a dynamic random access memory (DRAM), a read-only memory (ROM), an erasable programmable read-only memory (EPROM or Flash memory), a portable compact disc read-only memory (CD-ROM), an optical storage device, a magnetic storage device, or any suitable combination of the foregoing.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of network, including a local area network (LAN) or a wide area network (WAN), or the connection may be made through other devices (for example, through the Internet using an Internet Service Provider) or through a hard wire connection, such as over a USB connection. For example, a server having a first processor, a network interface, and a storage device for storing code may store the program code for carrying out the operations and provide this code through its network interface via a network to a second device having a second processor for execution of the code on the second device.

Aspects are described herein with reference to the figures, which illustrate example methods, devices and program products according to various example embodiments. These program instructions may be provided to a processor of a general purpose computer, special purpose computer, or other programmable data processing device or information handling device to produce a machine, such that the instructions, which execute via a processor of the device implement the functions/acts specified.

The program instructions may also be stored in a device readable medium that can direct a device to function in a particular manner, such that the instructions stored in the device readable medium produce an article of manufacture including instructions which implement the function/act specified. The program instructions may also be loaded onto a device to cause a series of operational steps to be performed on the device to produce a device implemented process such that the instructions which execute on the device provide processes for implementing the functions/acts specified.

Although illustrative example embodiments have been described herein with reference to the accompanying figures, it is to be understood that this description is not limiting and that various other changes and modifications may be affected therein by one skilled in the art without departing from the scope or spirit of the disclosure.

The modules/applications herein may include any processor-based or microprocessor-based system including systems using microcontrollers, reduced instruction set computers (RISC), application specific integrated circuits (ASICs), field-programmable gate arrays (FPGAs), logic circuits, and any other circuit or processor capable of executing the functions described herein. Additionally or alternatively, the modules/controllers herein may represent circuit modules that may be implemented as hardware with associated instructions (for example, software stored on a tangible and non-transitory computer readable storage medium, such as a computer hard drive, ROM, RAM, or the like) that perform the operations described herein. The above examples are exemplary only, and are thus not intended to limit in any way the definition and/or meaning of the term "controller." The modules/applications herein may execute a set of instructions that are stored in one or more storage elements, in order to process data. The storage elements may also store data or other information as desired or needed. The storage element may be in the form of an information source or a physical memory element within the modules/controllers herein. The set of instructions may include various commands that instruct the modules/applications herein to perform specific operations such as the methods and processes of the various embodiments of the subject matter described herein. The set of instructions may be in the form of a software program. The software may be in various forms such as system software or application software. Further, the software may be in the form of a collection of separate programs or modules, a program module within a larger program or a portion of a program module. The software also may include modular programming in the form of object-oriented programming. The processing of input data by the processing machine may be in response to user commands, or in response to results of previous processing, or in response to a request made by another processing machine.

It is to be understood that the subject matter described herein is not limited in its application to the details of construction and the arrangement of components set forth in the description herein or illustrated in the drawings hereof. The subject matter described herein is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

It is to be understood that the above description is intended to be illustrative, and not restrictive. For example, the above-described embodiments (and/or aspects thereof) may be used in combination with each other. In addition, many modifications may be made to adapt a particular situation or material to the teachings herein without departing from its scope. While the dimensions, types of materials and coatings described herein are intended to define various parameters, they are by no means limiting and are illustrative in nature. Many other embodiments will be apparent to those of skill in the art upon reviewing the above description. The scope of the embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects or order of execution on their acts.

What is claimed is:

1. A computer process, comprising:
   outputting for display, on a user device, an interactive electronic catalog page that includes an image of a physical product;
   maintaining, in computer storage, image mapping data that maps particular regions of the image to respective component identifiers of components of the physical product, each of the components being separately reviewable by electronic catalog users;
   in response to user interaction with the electronic catalog page on the user device, updating a display of the electronic catalog page to include a plurality of region identifiers on the image, each region identifier identifying a respective one of the particular regions of the image, each region being individually selectable on the electronic catalog page to select the corresponding, separately reviewable component of the physical product;
   detecting a user selection, on the interactive electronic catalog page, of one of the particular regions of the image;
   determining, from the image mapping data, a component identifier corresponding to the selected region of the image, said component identifier identifying a component selected by the user;
   updating a display of the interactive electronic catalog page with a display of user-submitted reviews that are specific to the selected component; and
   providing a user option, in connection with the selection of the component, to submit a review that is specific to the selected component;
   said process performed under control of executable program code.

2. The computer process of claim 1, wherein the region identifiers include respective boxes positioned on the image to indicate locations in the image of respective components.

3. The computer process of claim 2, wherein the boxes are partially transparent.

4. The computer process of claim 2, further comprising, for at least a first of the boxes, displaying on the image a graphical indication of an average user rating of a corresponding component.

5. The computer process of claim 1, further comprising, for at least a first region identifier of the plurality of region identifiers, displaying on the image a graphical indication of an average user rating of a corresponding component.

6. The computer process of claim 1, further comprising displaying on the image a translucent rating map indicating, for at least some of the components that are separately reviewable, respective average user ratings of the components.

7. The computer process of claim 1, wherein the user interaction with the electronic catalog page comprises movement of a cursor over the image.

8. The computer process of claim 1, wherein the region identifiers are displayed at least partly by modifying display sizes of corresponding components within the image.

9. The computer process of claim 1, wherein updating a display of the electronic catalog page to include the plurality of region identifiers comprises executing a script on the user device.

10. The computer process of claim 1, further comprising, in response to a shape drawing action performed by the user on the image, defining a new region for a component corresponding to the shape drawing action.

11. A computing system comprising a server having a processor and a memory, the computing system programmed with executable program code to perform a process that comprises:
  generating an interactive electronic catalog page that includes an image of a physical product;
  maintaining, in computer storage, image mapping data that maps particular regions of the image to respective component identifiers of components of the physical product, each of the components being separately reviewable by electronic catalog users;
  in response to user interaction with the electronic catalog page on a user device, updating a display of the electronic catalog page to include a plurality of region identifiers on the image, each region identifier identifying a respective one of the particular regions of the image, each region being individually selectable on the electronic catalog page to select the corresponding, separately reviewable component of the physical product;
  detecting a user selection, on the interactive electronic catalog page, of one of the particular regions of the image;
  determining, from the image mapping data, a component identifier corresponding to the selected region of the image, said component identifier identifying a component selected by the user;
  updating a display of the interactive electronic catalog page with a display of user-submitted reviews that are specific to the selected component; and
  providing a user option, in connection with the selection of the component, to submit a review that is specific to the selected component.

12. The computing system of claim 11, wherein the region identifiers include respective boxes positioned to indicate locations in the image of respective components.

13. The computing system of claim 12, wherein the boxes are partially transparent.

14. The computing system of claim 12, wherein the process further comprises, for at least a first of the boxes, displaying a graphical indication of an average user rating of a corresponding component.

15. The computing system of claim 11, wherein the process further comprises, for at least a first region identifier of the plurality of region identifiers, displaying a graphical indication of an average user rating of a corresponding component.

16. The computing system of claim 11, wherein the process further comprises displaying on the image a translucent rating map indicating, for at least some of the components that are separately reviewable, respective average user ratings of the components.

17. The computing system of claim 11, wherein the user interaction with the electronic catalog page comprises movement of a cursor over the image.

18. The computing system of claim 11, wherein the user interaction with the electronic catalog page comprises a touch event on a touch screen.

19. The computing system of claim 11, wherein the region identifiers are displayed at least partly by modifying display sizes of corresponding components within the image.

20. The computing system of claim 11, wherein updating a display of the electronic catalog page to include the plurality of region identifiers comprises executing a script on the user device.

21. The computing system of claim 11, wherein the process further comprises, in response to a shape drawing action performed on the image, defining a new region for a component corresponding to the shape drawing action.

* * * * *